(12) United States Patent
Kittaka et al.

(10) Patent No.: US 6,366,408 B1
(45) Date of Patent: Apr. 2, 2002

(54) OPTICAL IMAGING SYSTEM

(75) Inventors: Shigeo Kittaka; Hiroyuki Nemoto; Shinji Kawamoto, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/489,503

(22) Filed: Jan. 21, 2000

(30) Foreign Application Priority Data

Jan. 28, 1999 (JP) .......................................... 11-020803

(51) Int. Cl.$^7$ ............................ G02B 27/10; G02B 3/00
(52) U.S. Cl. ...................... 359/620; 359/619; 359/621; 359/654
(58) Field of Search ........................ 359/619, 620–624, 359/626, 628, 738–740, 654, 652

(56) References Cited

U.S. PATENT DOCUMENTS

| | | | | |
|---|---|---|---|---|
| 5,453,876 A | * | 9/1995 | Hamada | 359/625 |
| 5,581,379 A | * | 12/1996 | Aoyama et al. | 349/5 |
| 5,796,522 A | * | 8/1998 | Meyers | 359/626 |
| 5,959,783 A | * | 9/1999 | Kittaka et al. | 359/654 |
| 6,215,594 B1 | * | 4/2001 | Inoguchi et al. | 359/619 |
| 6,239,912 B1 | * | 5/2001 | Ozawa | 359/618 |

FOREIGN PATENT DOCUMENTS

| | | | |
|---|---|---|---|
| JP | 55-90908 | | 7/1980 |
| JP | 57-188010 A | * | 11/1982 |
| JP | 1-312502 A | * | 12/1989 |
| JP | 2-308122 A | * | 12/1990 |

OTHER PUBLICATIONS

Patent Abstracts of Japan, Publication Number 55090908 A, Publication Date Jul. 10, 1980, 1 Page.

* cited by examiner

*Primary Examiner*—Jordan M. Schwartz
(74) *Attorney, Agent, or Firm*—Rosenthal & Osha L.L.P.

(57) ABSTRACT

The invention presents an optical imaging system, which eliminates portions of an image with large image curvature, improving the resolving power. A plurality of columnar rod lenses 1 with a refractive index distribution in the radial direction is arranged in one or more rows in a rod lens array 2 for one-to-one imaging with their optical axes 1*a* in parallel. An object plane 3 and an image plane 4 are arranged on the two sides of the rod lens array 2, constituting an optical imaging system. Rectangular aperture stops 5 are provided on both faces of the rod lenses 1, so that they cover both end portions of the rod lenses 1 in the Y-axis direction (longitudinal direction of the rod lens array 2).

62 Claims, 33 Drawing Sheets

OPTICAL IMAGING SYSTEM

FIELD OF THE INVENTION

This invention relates to an optical imaging system used in an image transmission portion of, for example, a facsimile device or a copier.

BACKGROUND OF THE INVENTION

Optical imaging systems which include a plurality of rod lenses with a refractive index distribution in a radial direction and are arranged in an array, and those that contain a homogeneous lens array of convex microlenses that are arranged regularly and have a predetermined curvature on their front and back sides are widely used in the image transmission portion of, for example, facsimile devices or copiers.

Lenses used for rod lens arrays often have diameters of 0.6 to 1.1 mm, and a resolving power demanded from such a rod lens array called for an MTF (modulation transfer function) of at least 60% when a pattern of spatial frequency of 4–6 line-pairs / mm(ca. 200 dpi–300 dpi) is imaged.

The refractive index distribution of such rod lenses can be expressed as:

$$n(r)^2 = n_0^2 \cdot \{1 - (g \cdot r)^2 + h_4 \cdot (g \cdot r)^4 + h_6 \cdot (g \cdot r)^6\} \quad \text{Eq. 1}$$

wherein r is the radial distance from the optical axis of the rod lens, n(r) is the refractive index at the radial distance r from the optical axis of the rod lenses, $n_0$ is the refractive index at the optical axis of the rod lens (center refractive index), and g, $h_4$ and $h_6$ are coefficients for the refractive index distribution.

The brightness of the rod lenses depends mainly on the aperture angle θ (°), which can be expressed by $$\theta = (n_0 \cdot g \cdot r_0)/(\pi/180). \quad \text{Eq. 2}$$

wherein $r_0$ is the radius of the portion of the rod lenses functioning as a lens.

The larger the aperture angle θ is, the brighter the achieved image and the shorter the time required for scanning. The largest aperture angle θ found in available rod lenses is 23°.

In the case of rod lenses used for one-to-one imaging, spherical aberration and image surface curvature are the main cause of deterioration of the resolving power. Spherical aberration on the optical axis can be corrected by optimizing the refractive index distribution. However, since rod lenses consist basically only of convex lenses, the Petzval sum becomes large, and thus the image surface curvature cannot be corrected. In addition, because a plurality of lens images are superimposed in a rod lens array, blurred images are superimposed on each other when there is image surface curvature, which leads to a considerable deterioration of the resolving power. Because the image surface curvature is proportional to the square of the aperture angle θ, as the aperture angle increases (that is, the brighter the lens is), the influence of image surface curvature increases.

Recently, because of the improved image quality of printers and scanner, a resolving power of at least 12 line-pair/mm (ca. 600 dpi) is demanded of such rod lens arrays. Therefore, it is necessary to suppress the image surface curvature to a minimum in order to improve the resolving power.

There are two methods for reducing the image surface curvature to improve the resolving power. A first method is to use rod lenses with a small aperture angle θ. For example, if the diameter of the rod lenses is 0.6 mm, and the aperture angle is 10° or less, the influence of the image surface curvature is so small that it can be ignored. However, reducing the aperture angle θ makes the image darker, which causes the problem of longer scanning times.

A second method for reducing the image surface curvature to improve the resolving power is to reduce the diameter of the rod lenses. The variation of the focal point due to image surface curvature becomes smaller in proportion with the diameter of the rod lenses, so that the resolving power can be improved even when bright rod lenses with a large aperture angle θ are used. However, when the diameter of the rod lenses is reduced, the distance WD between the rod lenses and the image plane becomes small, so that there is the problem that there is too little space to arrange for an illumination system or a sensor device. Moreover, the precision required for assembling the rod lens array becomes extreme, which becomes a factor for rising costs.

Besides rod lens arrays, homogenous lens arrays, in which roof lens arrays of convex lenses aligned with a reflector or two lens array plates in which convex microlenses are arranged regularly in the front side and back side of a transparent plate with a uniform refractive index are aligned, are also known as optical elements for one-to-one imaging. However, since these optical elements as well consist basically only of convex lenses, the Petzval sum becomes large, as pointed out above, and there is the same problem of lower resolving power due to image surface curvature as in rod lens arrays with refractive index distribution.

Moreover, if an erect one-to-one image is to be attained by using a homogenous lens array, adjacent lenses have to be separated, so as to prevent the adverse effect of transfer images due to stray light from adjacent lenses entering the lens faces arranged on one optical axis. For this case, Publication of Unexamined Japanese Patent Application No. Sho 55-90908 discloses a method, in which the lenses arranged on the optical axis are rod-shaped, and separated by a different material disposed between the rod lenses.

However, homogenous erect one-to-one lens arrays using rod lenses have a complex configuration, and rising costs due to complex steps and performance variations caused by their assembly cannot be avoided.

SUMMARY OF THE INVENTION

The present invention has been achieved in order to solve the above-mentioned problems of the prior art, and its object is to provide an optical imaging system whose resolving power can be improved by eliminating image portions with large image surface curvature. It is a further object of the present invention to provide an optical imaging system for erect one-to-one imaging using a homogenous material that can be easily molded into a lens array, and in which stray light does not enter adjacent lenses.

In order to attain these objects, an optical imaging system for focusing light from an object plane onto an image plane in accordance with the present invention includes a lens array having a plurality of optical lens systems that are arranged in at least one row with optical axes of the lens systems in parallel; and further includes, at least in a longitudinal direction of the lens array, means for blocking light rays that pass through the lens faces of the optical lens systems at an angle larger than a predetermined angle with respect to the optical axes of the optical lens systems. With this configuration, light rays that pass through the lens faces of the optical lens systems at an angle larger than a predetermined angle with respect to the optical axes of the optical lens systems are blocked in a longitudinal direction of the lens array, so that the aperture angle becomes smaller. Thus, a portion of the image with large image surface curvature is eliminated, and the resolving power of the lens array is improved.

In this configuration of an optical imaging system, it is preferable that light rays that pass through the lens faces of the optical lens systems are not blocked in a direction that is perpendicular to the longitudinal direction of the lens array.

In this configuration of an optical imaging system, it is also preferable that the optical lens systems include rod lenses having a refractive index distribution in a radial direction. It is also preferable that both edge portions of the rod lenses in the longitudinal direction of the lens array are shaved off along the optical axis of the rod lenses. In this configuration, light rays that pass through the lens faces of the optical lens systems at an angle larger than a predetermined angle with respect to the optical axes of the optical lens systems are blocked in a longitudinal direction of the lens array, so that the aperture angle becomes smaller. Thus, a portion of the image with large image surface curvature is eliminated, and the resolving power of the lens array is improved. In this case, it is even more preferable that $r_y/r_0$ is in the range given by $$0.1 \leq r_y/r_0 \leq 0.8$$

wherein $r_0$ is the radius of the portion of the rod lenses functioning as a lens, and $2r_y$ is the length in the longitudinal direction of the lens array of the rod lenses after both edge portions of the rod lenses in the longitudinal direction of the lens array have been shaved off along the optical axis of the rod lenses. If $r_y/r_0$ is less than 0.1, the rod lenses become too narrow and the number of rod lenses that are necessary for the rod lens array becomes too large. If $r_0/r_y$ exceeds 0.8, the remaining image surface curvature becomes large, so that the resolving power deteriorates. Preferably, when rod lenses are used, pairs of cut-outs are provided that oppose each other in a substantially central portion in the direction of the optical axes of the rod lenses, and the normals of the faces of the cut-outs that oppose each other point into the longitudinal direction of the lens array. With this configuration, a resin or the like can be filled into the cut-outs of the rod lenses when assembling the lens array, so that light rays are blocked in the longitudinal direction of the lens array that are affiliated with the image portions with a large image curvature, and the aperture angle is reduced. As a result, the image portion with a large image surface curvature is eliminated, which improves the resolving power when using the rod lens array. In this case, it is even more preferable that $r_y/r_0$ is in the range given by $$0.1 \leq r_y/r_0 \leq 0.8$$

wherein $r_0$ is the radius of the portion of the rod lenses functioning as a lens, and $2r_y$ is the distance between the opposing faces of the pairs of cut-outs.

If rod lenses with a refractive index distribution are used for the one-to-one optical imaging systems, it is preferable that the refractive index distribution of the rod lenses is $$n(r)^2 = n^{02} \cdot \{1-(g \cdot r)^2 + h_4 \cdot (g \cdot r)^4 + h_6 \cdot (g \cdot r)^6\}$$

wherein r is the radial distance from the optical axis of the rod lenses, $n_0$ is the refractive index at the optical axis of the rod lenses, and g, $h_4$ and $h_6$ are coefficients for a refractive index distribution. In this case, it is also preferable that the aperture angle θ of the rod lenses, which is defined as $\theta = (n_0 \cdot g \cdot r_0)/(\pi/180)$, is in the range given by $4° \leq \theta \leq 40°$. In this case, it is furthermore preferable that the refractive index $n_0$ at the optical axis of the rod lenses is in the range given by $1.4 \leq n_0 \leq 1.9$. In this case, it is also preferable that $Z_0/P$ is in the range given by $0.5 \leq Z_0/P \leq 1.0$, wherein $Z_0$ is the length of the rod lenses and $P = 2\pi/g$ is a one-pitch length of the rod lenses.

With these preferable configurations, erect imaging is possible. Moreover, except for the case that both edge portions of the rod lenses in the longitudinal direction of the lens array are shaved off along the optical axes of the rod lenses, it is also preferable that $r_0/R$ is in the range given by $0.5 \leq r_0 R \leq =1.0$, wherein $r_0$ is the radius of the portion of the rod lens functioning as a lens, and 2R is the distance 2R between the optical axes of two adjacent rod lenses.

In the above-mentioned configuration of an optical imaging system in accordance with the present invention, it is preferable that the means for blocking light rays include aperture stops provided in at least one space selected from a space between the lens array and the object plane and a space between the lens array and the image plane. With this configuration, light rays that pass through the lens faces of the optical lens systems at an angle that is larger than a predetermined angle with respect to the optical axes of the optical lens systems are blocked in a longitudinal direction of the lens array, so that the aperture angle becomes smaller. Thus, a portion of the image with large image surface curvature is eliminated, and the resolving power of the lens array is improved. In this case, in accordance with one or more embodiments, it is preferable that the aperture stops are substantially rectangular. Also, in this case, in accordance with one or more embodiments, it is preferable that the aperture stops are substantially elliptical. Further, in accordance with one or more embodiments, it is preferable that the aperture stops are provided at a distance from and end face of the optical lens systems. With this configuration, light rays associated with large image surface curvature can be blocked, while occupying a large effective surface area of the lens. In this case, it is also preferable that the thickness of the aperture stops in the direction of the optical axes of the lenses is in the range of $r_0$ to $5r_0$, where $r_0$ is the radius of the portion of the rod lenses functioning as a lens. In this case, it is also preferable that the aperture stops are provided in multiple stages. With this configuration, the same effect as with thick aperture stops can be attained, while using thin aperture stops for each stage, so that more precise perforations are possible. In this case, it is also preferable that the aperture stops are formed by blackening a surface of a transparent plate with a printed pattern. With this configuration, a pattern with more precise dimensions can be manufactured at lower costs than when thin plates with perforations are used. In this case, it is preferable that the optical lens systems are rod lenses with a refractive index distribution in the radial direction, and $r_y/r_0$ is in the range given by $$0.1 \leq r_y/r_0 \leq 0.9$$

wherein $r_0$ is the radius of the portion of the rod lenses functioning as a lens, and $r_y$ is the effective radius of the rod lenses, which are restricted by the aperture stops, in the longitudinal direction of the lens array. In this case, it is preferable that the refractive index distribution of the rod lenses is $$n(r)^2 = n_0^2 \cdot \{1-(g \cdot r)^2 + h_4 \cdot (g \cdot r)^4 + h_6 \cdot (g \cdot r)^6\}$$

wherein r is the radial distance from the optical axis of the rod lenses, $n_0$ is the refractive index at the optical axis of the rod lenses, and g, $h_4$ and $h_6$ are coefficients for a refractive index distribution. In this case, it is also preferable that the aperture angle θ of the rod lenses, which is defined as $θ=(n_0·g·r_0)/(π/180)$, is in the range given by $4°≦θ≦40°$. In this case, it is furthermore preferable that the refractive index $n_0$ at the optical axis of the rod lenses is in the range given by $1.4≦n_0≦1.9$. In this case, it is also preferable that $Z_0/P$ is in the range given by $0.5≦Z_0/P≦1.0$, wherein $Z_0$ is the length of the rod lenses and $P=2π/g$ is a one-pitch length of the rod lenses. Moreover, except for the case that both edge portions of the rod lenses in the longitudinal direction of the lens array are shaved off along the optical axes of the rod lenses, it is also preferable that $r_0/R$ is in the range given by $0.5≦r_0/R≦1.0$, wherein $r_0$ is the radius of the portion of the rod lens functioning as a lens, and 2R is the distance 2R between the optical axes of two adjacent rod lenses.

In the above-mentioned configuration of an optical imaging system in accordance with one or more embodiments of the present invention, it is preferable that the lens array includes an erect one-to-one lens array, in which two homogenous lens array plates are stacked on top of each other, with microlenses, whose front and back surface have a certain curvature and which function as convex lenses, being arranged regularly in the two homogenous lens array plates.

In the above-mentioned configuration of an optical imaging system in accordance with the present invention, it is preferable that the means for blocking light rays include light-blocking plates disposed in at least one space selected from the group consisting of the space between the lens array and the object plane and the space between the lens array and the image plane. With this configuration, light rays that pass through the lens faces of the optical lens systems at an angle that is larger than a predetermined angle with respect to the optical axes of the optical lens systems are blocked in a longitudinal direction of the lens array, so that the aperture angle becomes smaller. Thus, a portion of the image with large image surface curvature is eliminated, and the resolving power of the lens array is improved. In this case, it is preferable that the light-blocking plates are arranged periodically in a longitudinal direction of the lens array. When the light-blocking plates are arranged in an irregular fashion, irregularities in the light amount may result. In this case, it is preferable that the light-blocking plates are flat and the light-blocking plates are arranged at constant intervals in the longitudinal direction of the lens array. Furthermore, it is preferable that a space between adjacent light-blocking plates is filled with a transparent medium. With this configuration, not only can the light-blocking plates be made extremely thin, but it is also possible to prevent bending of the light-blocking plates and irregularities in the spacing. Furthermore, it is preferable that the light-blocking plates are provided at a distance from an end face of the optical lens systems. With this configuration, irregularities in the light amount caused by the pitch between the light-blocking plates can be lessened. Furthermore, it is preferable that the thickness of the light-blocking plates in the longitudinal direction of the lens array is not more than ⅕ of the pitch length of the intervals of the light-blocking plates. Furthermore, it is preferable that the interval pitch of the light-blocking plates is smaller than the pitch of the optical lens systems. With this configuration, periodic irregularities in the image brightness can be prevented. In this case it is even more preferable that the lens array is a homogenous erect one-to-one lens array, in which two homogenous lens array plates are stacked on top of each other, with microlenses, whose front and back surface have a certain curvature and which function as convex lenses, being arranged regularly in the two homogenous lens array plates, and the lens array is made by injection molding. With this configuration, stray light can be prevented by eliminating light rays with an angle that is larger than the aperture angle that enter the homogenous erect one-to-one lens array or leave the homogenous erect one-to-one lens array. As a result, the contrast of the image is improved, so that the transmission of a high quality image becomes possible. Moreover, setting light-blocking plates in front of a homogenous erect one-to-one lens array made by molding lenses in one piece allows a considerable reduction in production costs, because this achieves similar or better properties as with a lens array for homogenous erect one-to-one imaging in which a plurality of columnar rod lenses is arranged in a row with their optical axes in parallel.

In the above-mentioned configuration, it is preferable that the optical imaging system is provided with means for blocking, in the longitudinal direction of the lens array and in a direction that is perpendicular to the longitudinal direction of the lens array, light rays that pass through the lens faces of the optical lens systems at an angle that is larger than a predetermined angle with respect to the optical axes of the optical lens systems. In this case, it is preferable that the means for blocking light rays include light-blocking plates provided in at least one space selected from the group consisting of the space between the lens array and the object plane and the space between the lens array and the image plane, and the light-blocking plates are arranged periodically in two dimensions in a direction parallel to the object plane and the image plane. It is preferable that a space between adjacent light-blocking plates is filled with a transparent medium. It is also preferable that the light-blocking plates are disposed at a distance from an end face of the optical lens systems. Also, it is preferable that the light-blocking plates are honeycomb shaped. The reason for this is that with a honeycomb-shape, the difference in the restriction angles depends only little on the orientation, the plates can be made thin, and such a shape is easy to manufacture.

DESCRIPTION OF THE PREFERRED EMBODIMENTS

The following is a more detailed description of the embodiments of the present invention.

First Embodiment

Figure 1:
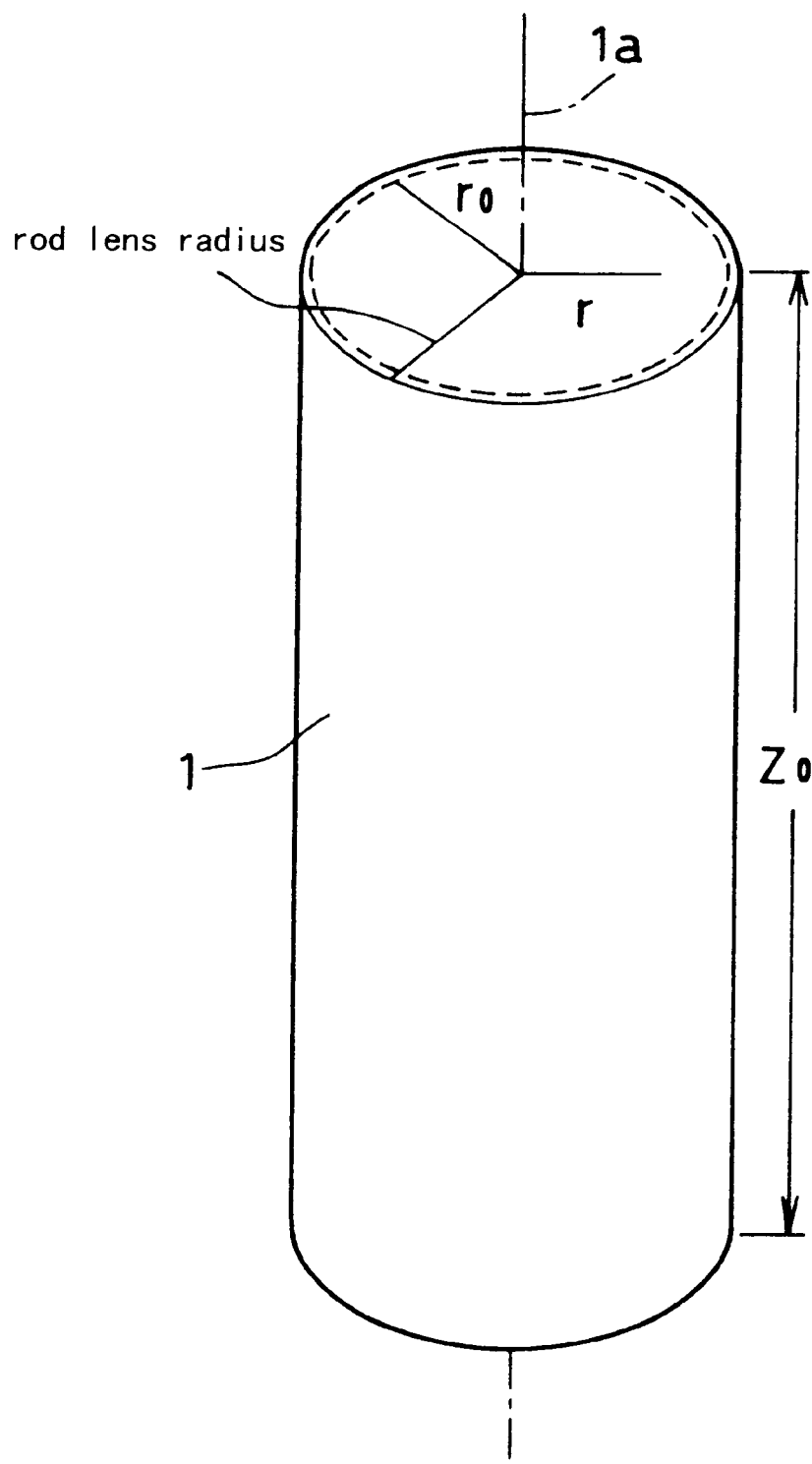
FIG. 1 is a perspective view of a rod lens used in an optical imaging system according to the first embodiment of the present invention.
Figure 2:
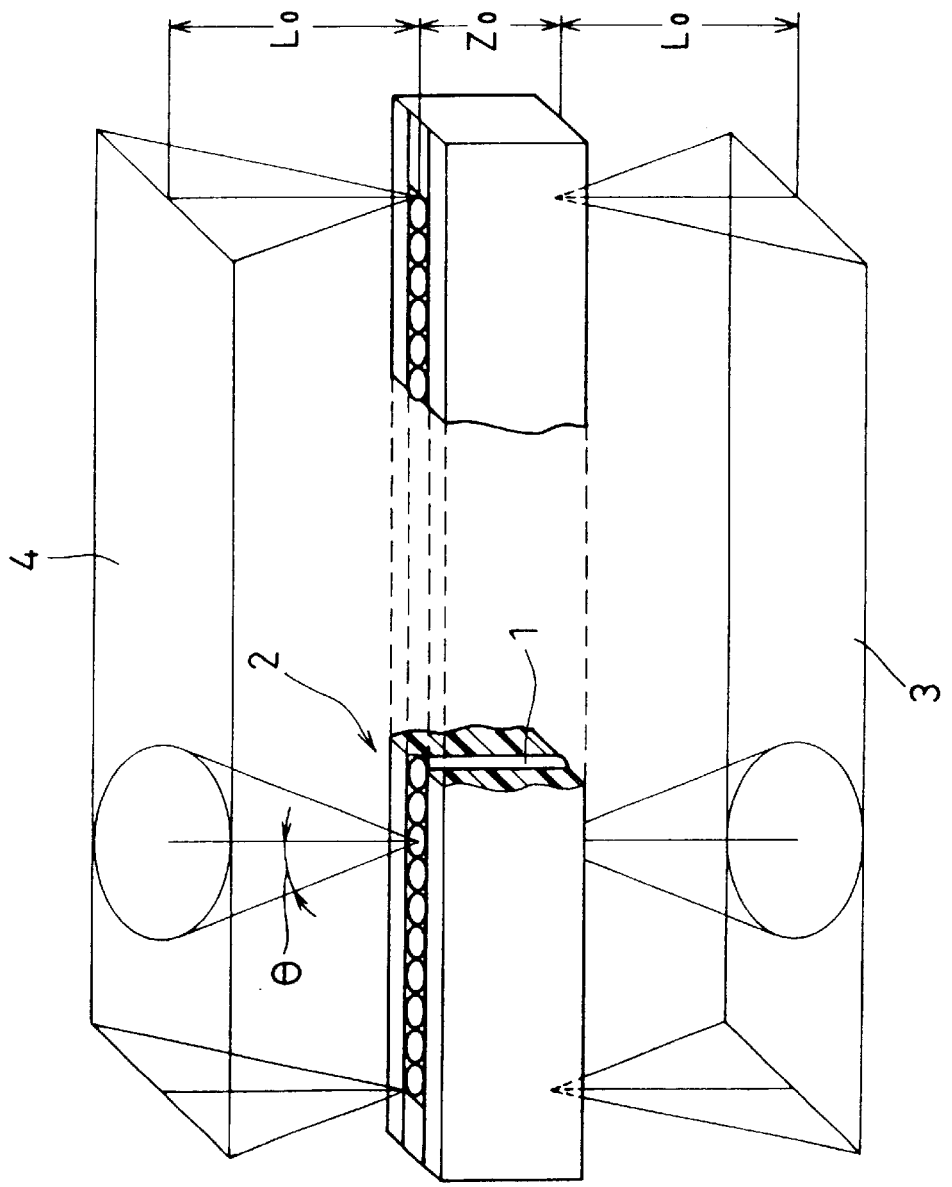
FIG. 2 is a perspective view of the configuration of an optical imaging system according to the first embodiment of the present invention. (The aperture stops have been omitted from this drawing.)

In the optical imaging system manufactured in accordance with this embodiment, as shown in FIGS. 1 and 2, a plurality of columnar rod lenses 1 with a refractive index distribution in the radial direction is arranged in one row in a rod lens array 2 for one-to-one imaging with their optical axes 1$a$ in parallel. This optical imaging system focuses light from an object plane 3 onto an image plane 4, the planes being arranged on the two sides of the rod lens array 2.

Figure 3A:
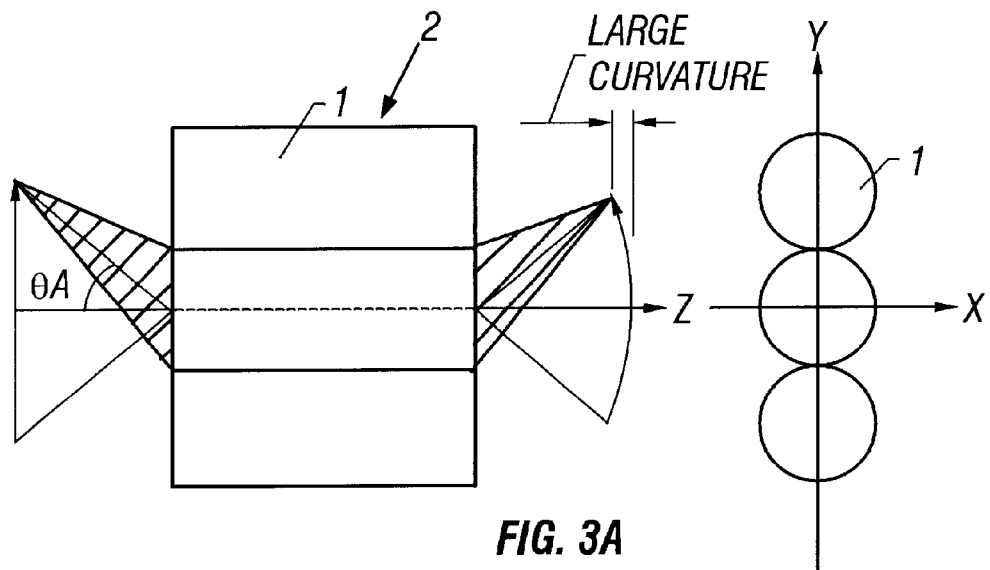
FIG. 3A is a layout drawing showing an optical imaging system.
Figure 3B:
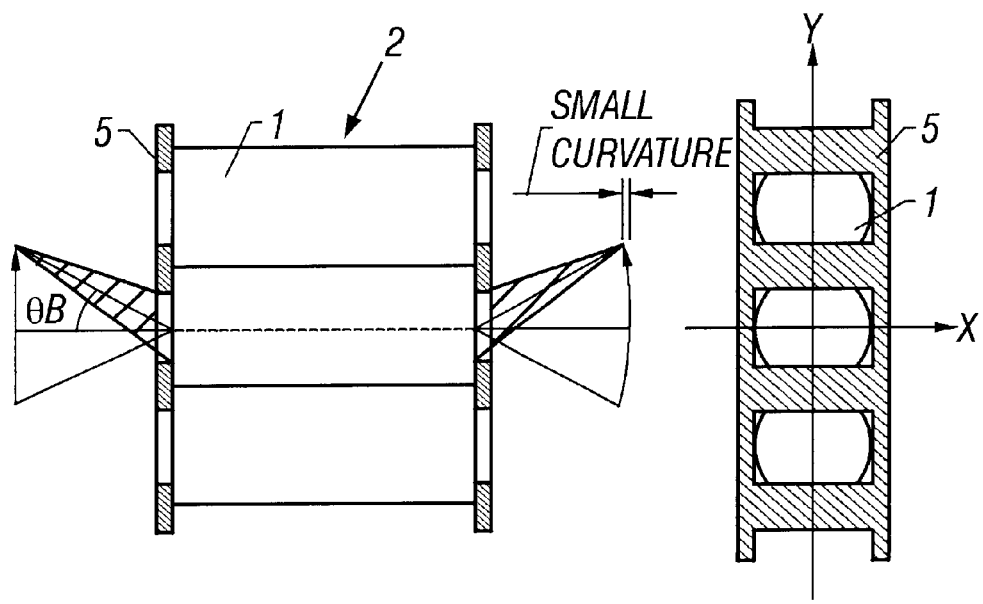
FIG. 3B is a layout drawing showing a configuration of an optical imaging system according to an embodiment of the present invention.

As is shown in FIG. 3(B), both end faces of the rod lenses 1 are provided with rectangular aperture stops 5 that cover both edge portions of each rod lens 1 in Y-axis direction (i.e. in the longitudinal direction of the rod lens array 2).

As is shown in FIG. 3(A), not providing the rod lenses 1 with aperture stops 5 results in a larger image surface curvature along the longitudinal direction (Y-axis direction) of the rod lens array 2. This has the consequence that the images of more than one rod lens 1 overlap in the imaging of the rod lens array 2. Thus, because of image surface curvature, the superimposed picture becomes blurred and the resolution worsens considerably.

On the other hand, if aperture stops 5 are provided on both end faces of the rod lenses 1 as shown in FIG. 3(B), they block, in the Y-axis direction, light rays entering or leaving the lens faces of the rod lenses 1 at more than a predetermined angle with respect to the optical axis 1$a$ of the rod lenses 1, reducing the aperture angle θ (i.e. $θ_B<θ_A$, when $θ_A$ is the aperture angle without aperture stops 5, and $θ_B$ is the aperture angle with aperture stops 5). Thus, a portion of the image at the large image surface curvature is excluded, and the resolving power of the rod lens array 2 is increased. In this case, the aperture and the image surface curvature in the X-axis direction (i.e. the direction perpendicular to the longitudinal direction of the rod lens array 2) is the same as in FIG. 3(A) where aperture stops 5 are not provided, but because the image utilized by a scanning device or the like is limited to a linear portion in the Y-axis direction, the influence of the image surface curvature in the X-axis direction can be ignored. Moreover, by providing aperture stops 5, the area of the lens faces of the rod lenses 1 is somewhat reduced in the Y-axis direction, but because it remains unchanged in the X-axis direction, the reduction of the brightness can be kept to a minimum.

Figure 4:
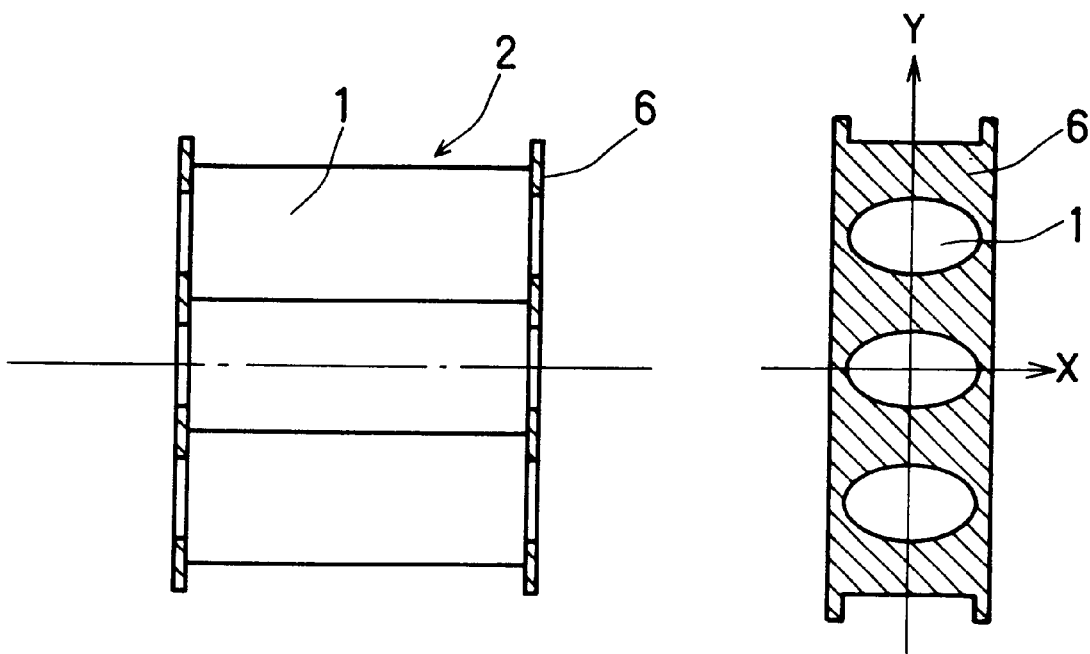
FIG. 4 is a layout drawing showing another configuration of an optical imaging system according to the first embodiment of the present invention.

It should be noted that this embodiment is explained by way of examples relating to rectangular aperture stops as the aperture stops 5, but the shape of the aperture stops 5 is in no way limited to being rectangular. The same effect as in this embodiment can be attained also if, for example, the rod lenses 1 are provided with aperture stops 6 that are elliptical with the major axis in the X-axis direction, as shown in FIG. 4.

Figure 5:
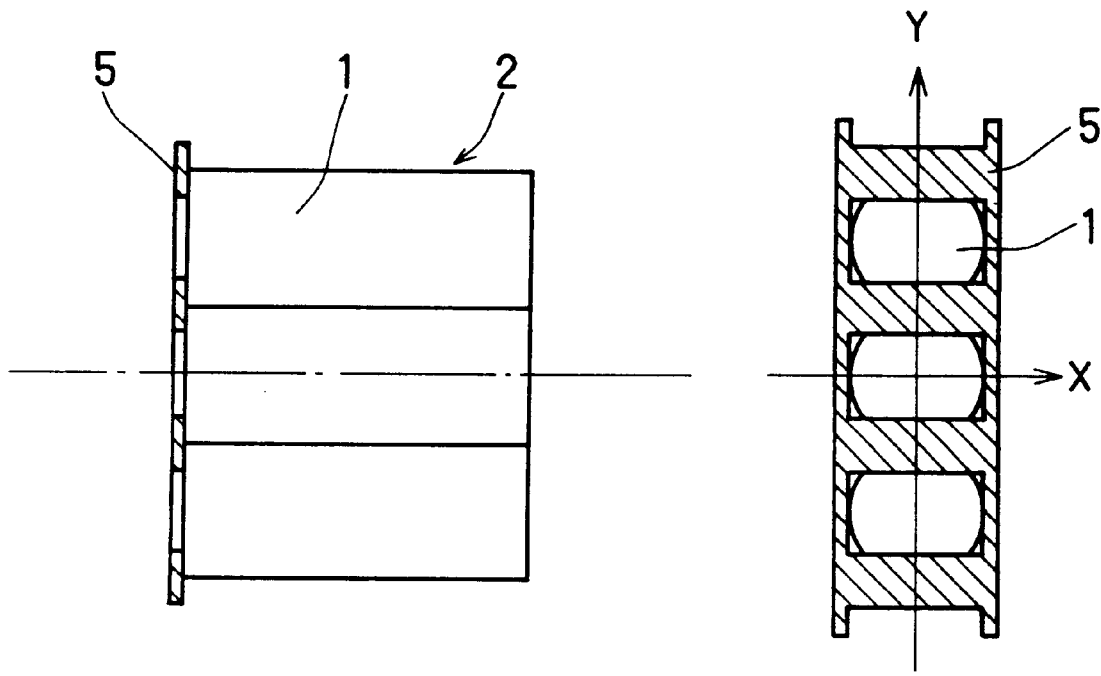
FIG. 5 is a layout drawing showing another configuration of an optical imaging system according to the first embodiment of the present invention.
Figure 6:
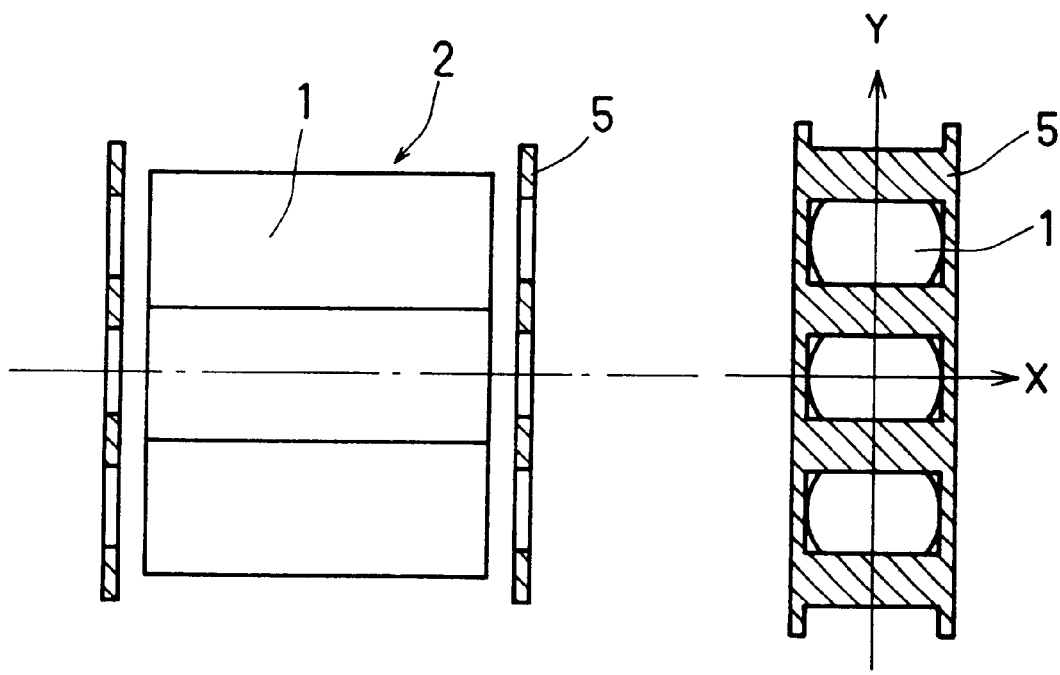
FIG. 6 is a layout drawing showing another configuration of an optical imaging system according to the first embodiment of the present invention.
Figure 7:
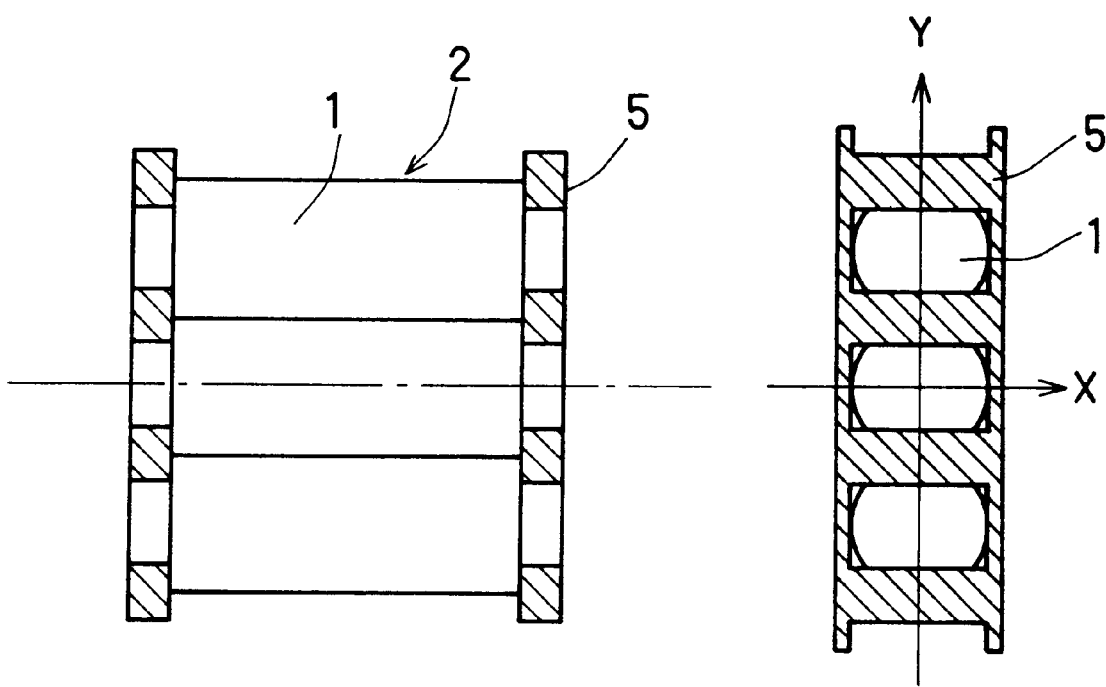
FIG. 7 is a layout drawing showing another configuration of an optical imaging system according to the first embodiment of the present invention.
Figure 8:
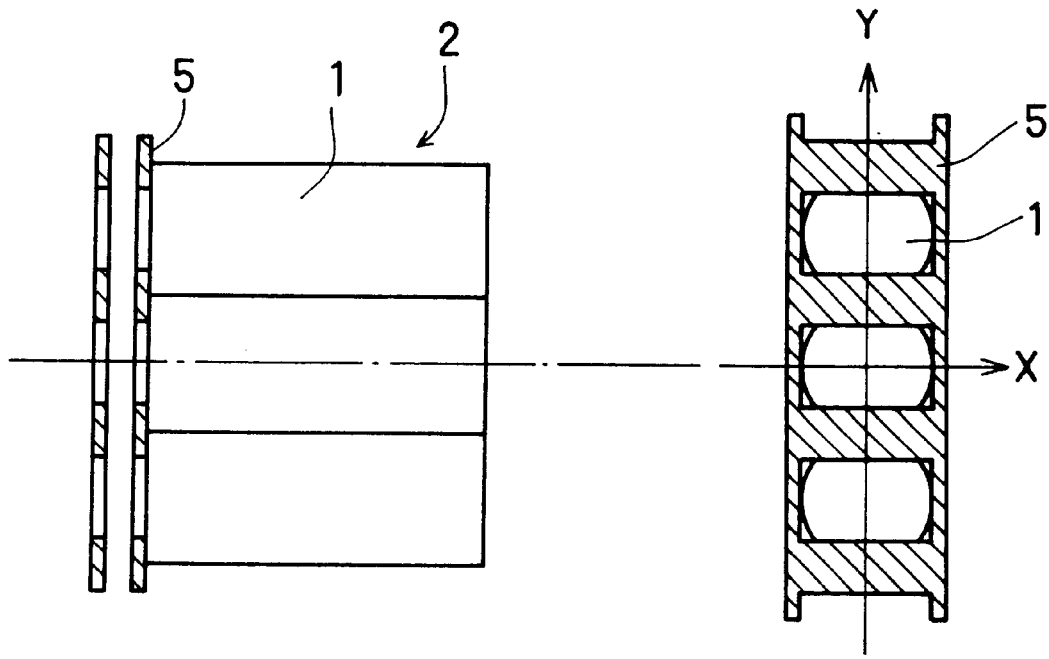
FIG. 8 is a layout drawing showing another configuration of an optical imaging system according to the first embodiment of the present invention.

Also, in this embodiment, aperture stops 5 are employed on both end faces of the rod lenses 1, but there is no limitation to this configuration, and it is also possible to provide aperture stops 5 only on one end face of the rod lenses 1, as shown in FIG. 5, which simplifies the configuration. Moreover, in order to block light rays at a large image surface curvature while taking a large effective area of the lenses, it is also possible to use configurations, wherein the aperture stops 5 are disposed at a distance from the end face of the rod lenses 1 (FIG. 6), the aperture stops 5 is made thick (FIG. 7), or to dispose aperture stops 5 in multiple stages (FIG. 8), and to use these configurations either alone or in combination.

If the aperture stops 5 or 6 are thick, the effect of the aperture stops shows at both sides in the optical axis direction. In order to maximize this effect, it is preferable that the thickness is at least the radius of the effective lens portion of the rod lenses 1, that is, the radius $r_0$ of the portion functioning as a lens. However, it is preferable that the thickness does not exceed $5r_0$, because then the image becomes too dark.

Moreover, if the aperture stops 5 are disposed at a distance from the end faces of the rod lenses 1, it is preferable that the distance between the aperture stops 5 and the end faces of the rod lenses 1 is at least $r_0$ but not more than $6r_0$.

Examples of suitable materials for the aperture stops 5 or 6 include metals, such as stainless steel, aluminum, and brass, and non-transparent plastics. It is also preferable that the surface of the aperture stops 5 or 6 is black and delustered, to reduce superfluous stray light.

Figure 9:
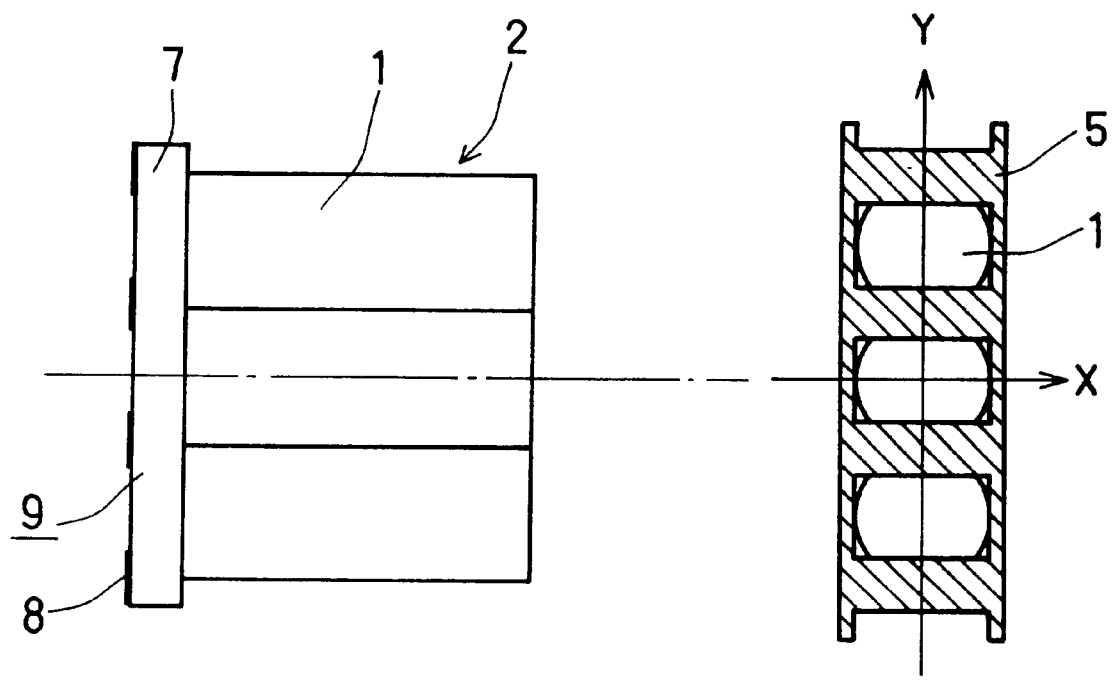
FIG. 9 is a layout drawing showing another configuration of an optical imaging system according to the first embodiment of the present invention.

It is also possible to use as an aperture stop 9 a transparent plate (for example a glass plate) 7 whose one side or both sides are partially blackened by a printed pattern 8 of black ink or paint, as shown in FIG. 9. Forming the aperture stops 9 with a printed pattern 8 allows a pattern with higher dimensional precision to be produced at lower cost than with a thin plate having holes.

Figure 10:
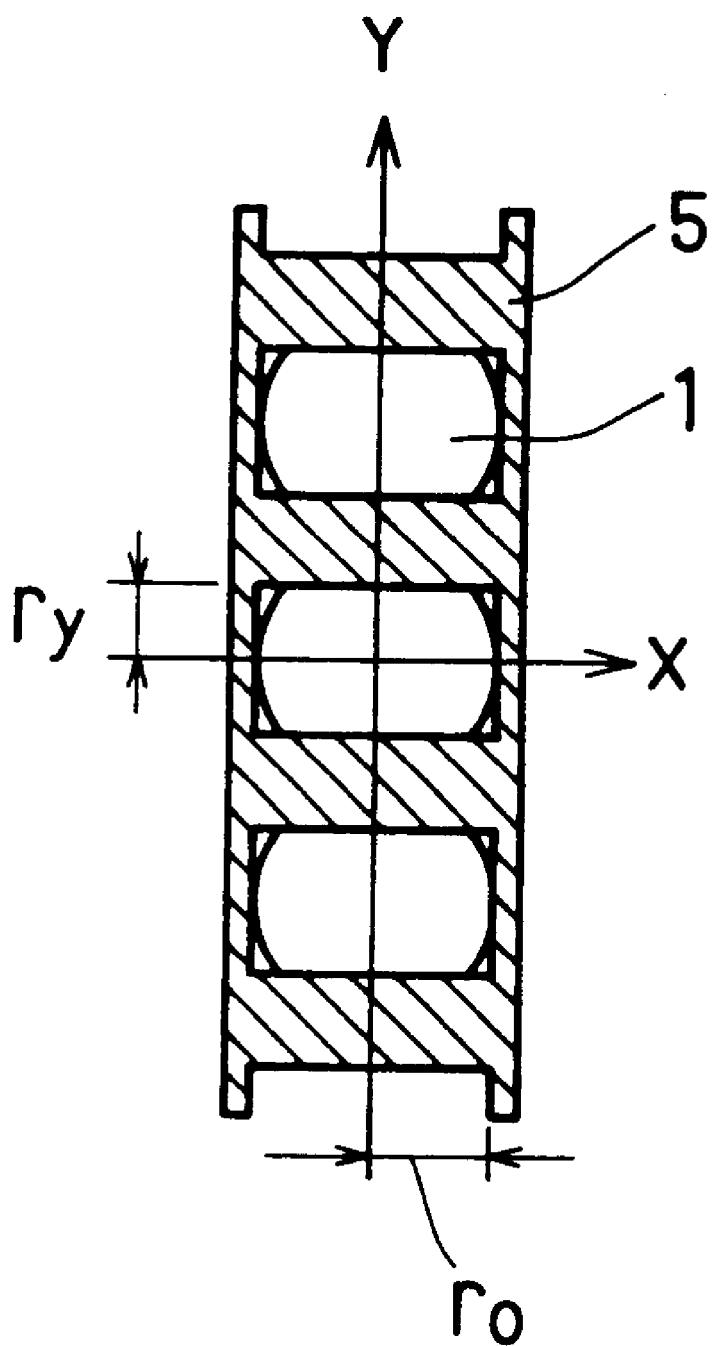
FIG. 10 is a diagram illustrating the dimensions of the aperture stops used in an optical imaging system according to the first embodiment of the present invention.

In any of the above cases, it is preferable that $r_y/r_0$ is in the range given by $0.1 \leq r_y/r_0 \leq 0.9$, wherein $r_0$ is the radius of the effective lens portion of the rod lenses 1, that is, the radius of the portion functioning as a lens, and $r_y$ is the effective radius of the rod lenses 1 in the Y-axis direction (i.e. in longitudinal direction of the rod lens array 2), which is restricted by the aperture stops 5 (or 6 or 9), as shown in FIG. 10. If $r_y/r_0$ is less than 0.1, the brightness of the lenses is reduced extremely, and if $r_0/r_y$ is more than 0.9, the remaining image surface curvature becomes large, so that the resolving power deteriorates.

Figure 11:
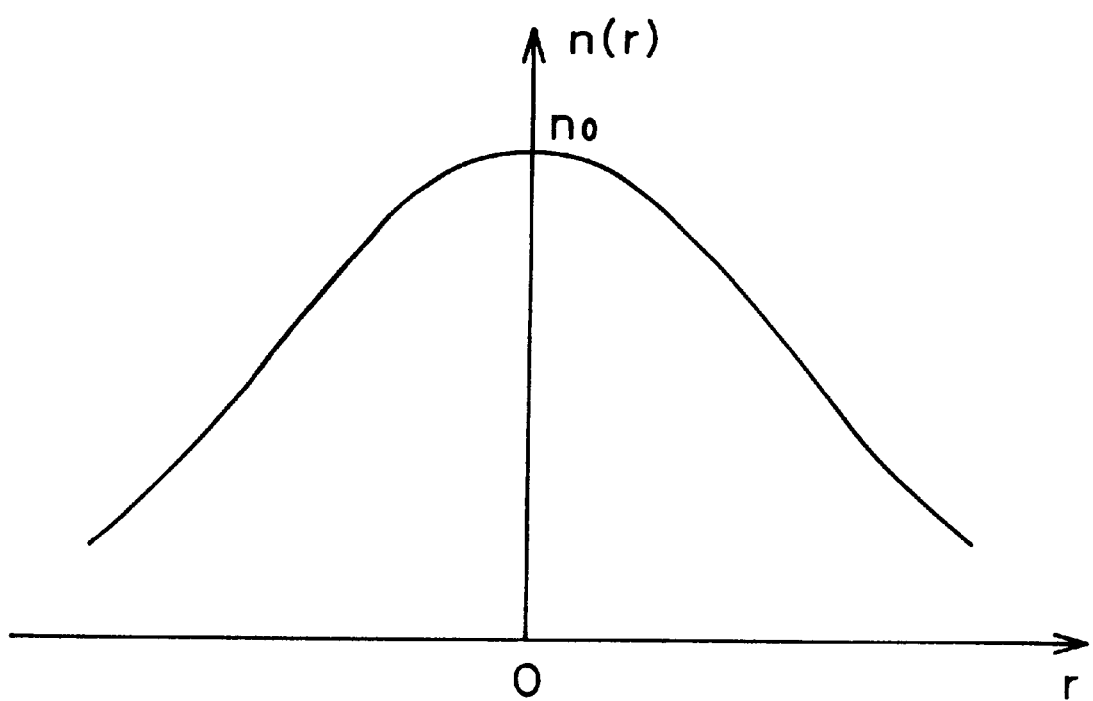
FIG. 11 is a graph of the refractive index distribution of the rod lenses used an optical imaging system according to the first embodiment of the present invention.

The curvature radius n of the rod lenses 1 undergoes a distribution in the radial direction as shown in FIG. 11, which can be described by $$n(r)^2 = n_0^2 \cdot \{1 - (g \cdot r)^2 + h_4 \cdot (g \cdot r)^4 + h_6 \cdot (g \cdot r)^6\} \quad \text{Eq.3}$$

wherein r is a radial distance from the optical axis 1*a* of the rod lenses 1, n(r) is the refractive index at the radial distance r from the optical axis 1*a* of the rod lenses 1, $n_0$ is the refractive index on the optical axis 1*a* of the rod lenses 1 (center refractive index), and g, $h_4$ and $h_6$ are coefficients of the refractive index distribution.

Figure 12:
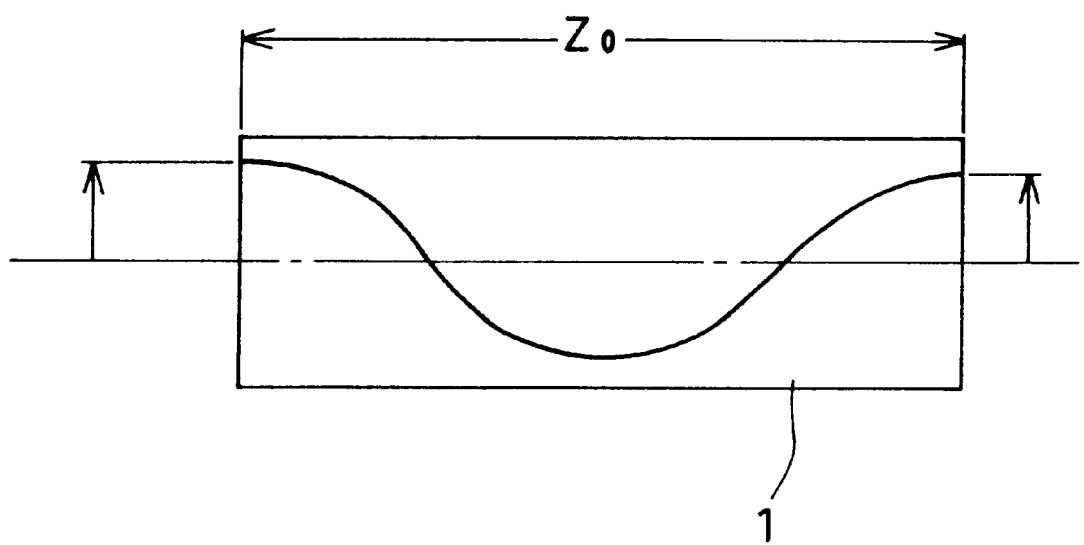
FIG. 12 is a schematic drawing illustrating the imaging with the rod lenses used in an optical imaging system according to the first embodiment of the present invention.

To attain an erect image as shown in FIG. 12, the ratio $Z_0/P$ of the length $Z_0$ of the rod lenses 1 and the one-pitch length $P = 2\pi/g$ of the rod lenses 1 has to be in the range $0.5 < Z_0/P < 1.0$.

In the case of a paraxial focus point, the distance $L_0$ between the end face (lens face) of the rod lens array 2 and the object plane 3, which is also the distance between the end face (lens face) of the rod lens array 2 and the image plane 4 (see FIG. 2) can be expressed by $$L_0 = -\{1/(n_0 \cdot g)\} \cdot \tan(Z_0 \pi/P). \quad \text{Eq.4}$$

Sometimes, however, the most favorable resolving power is attained when the distance between the end face (lens face) of the rod lens array 2 and the object plane 3 and the distance between the end face (lens face) of the rod lens array 2 and the image plane 4 (see FIG. 2) deviates somewhat from $L_0$, striking a balance between spherical aberrations and image surface curvature of the entire rod lens array 2.

It is preferable that the radius of the effective lens portion of the rod lenses 1, that is, the radius $r_0$ of the rod lens portion functioning as a lens, is in a range of $0.0 \text{ mm} \leq r_0 \leq 0.60 \text{ mm}$.

Lenses with a small $r_0$ can attain a high resolution more easily, because the amount of image distortion due to the various aberrations of the rod lenses 1 increases proportionally with the size of the entire lens. On the other hand, rod lenses 1 with an $r_0$ smaller than 0.0 mm are difficult to produce and to assemble. Also, when the radius $r_0$ of the effective lens portions of the rod lenses 1 in the rod lens array 2 is larger than 0.60 mm, the aberrations become too large.

The realizable value for the refractive index $n_0$ at the optical axis 1*a* of the rod lenses 1 (center refractive index) depends on the material for the rod lenses (glass or synthetic resin) and lies in the range of $1.4 \leq n_0 \leq 1.9$.

The brightness of the rod lenses 1 depends on the dimensionless factor $g \cdot r_0$ or on the aperture angle indicating the range over which the lenses can accept light. The aperture angle $\theta$ (°) can be expressed by $$\theta = (n_0 \cdot g \cdot r_0)/(\pi/180). \quad \text{Eq.5}$$

The aperture angle $\theta$ of rod lenses 1 produced, for example, by ion exchange is in the range given by $4° \leq \theta \leq 40°$. A preferable range for the present invention is $8° \leq \theta \leq 30°$. If the aperture angle $\theta$ is less than 8°, the influence of the image surface curvature is small to begin with, so that the effect of raising the resolving power with the aperture stops is small. Moreover, if the aperture angle $\theta$ is larger than 30°, the manufacture of the rod lenses 1 becomes difficult, and the influence of the image surface curvature becomes too large, so that the resolving power is insufficient even when employing the apertures stops.

It is preferable that the distance 2R between the optical axes of two adjacent rod lenses 1 is equal to $2r_0$ (i.e. the diameter of the effective lens portion of the rod lenses 1), because this makes the light amount utilized for imaging maximal. However, often the peripheral portion of the rod lenses 1 cannot be used as a lens, because its refractive index distribution varies considerably from the design value. Also, to prevent stray light due to total reflection at the side faces of the lens, a light-absorbing layer can be provided. Moreover, depending on the circumstances under which the rod lens array 2 is produced, the rod lenses 1 are sometimes arranged at a certain distance to each other. Considering these circumstances, it is preferable that that $r_0/R$ is set to $0.5 \leq r_0/R \leq 1.0$.

The inventors of the present invention designed a rod lens array 2 with the above configuration and the below specifications, and calculated the resolving power (MTF value) when providing rectangular aperture stops 5. The optical design software "Oslo Six" by Sinclair Optics (US) was used for the calculation.

| | |
|---|---|
| optical wavelength λ | 570 nm |
| lens diameter $2r_0$ | 0.563 mm |
| center refractive index $n_0$ | 1.639 |
| refractive index distribution coefficient g | 0.8637 mm$^{-1}$ |
| refractive index distribution coefficient $h_4$ | 0.54 |
| aperture angle θ | 22.4° |
| one-pitch length P of rod lenses | 7.28 mm |
| length $Z_0$ of rod lenses | 4.30 mm |
| $Z_0/P$ | 0.591 |
| distance 2R between optical axes of adjacent rod lenses | 0.563 mm |
| $r_0/R$ | 1.0 |
| $L_0$ | 2.40 mm |

Figure 13:
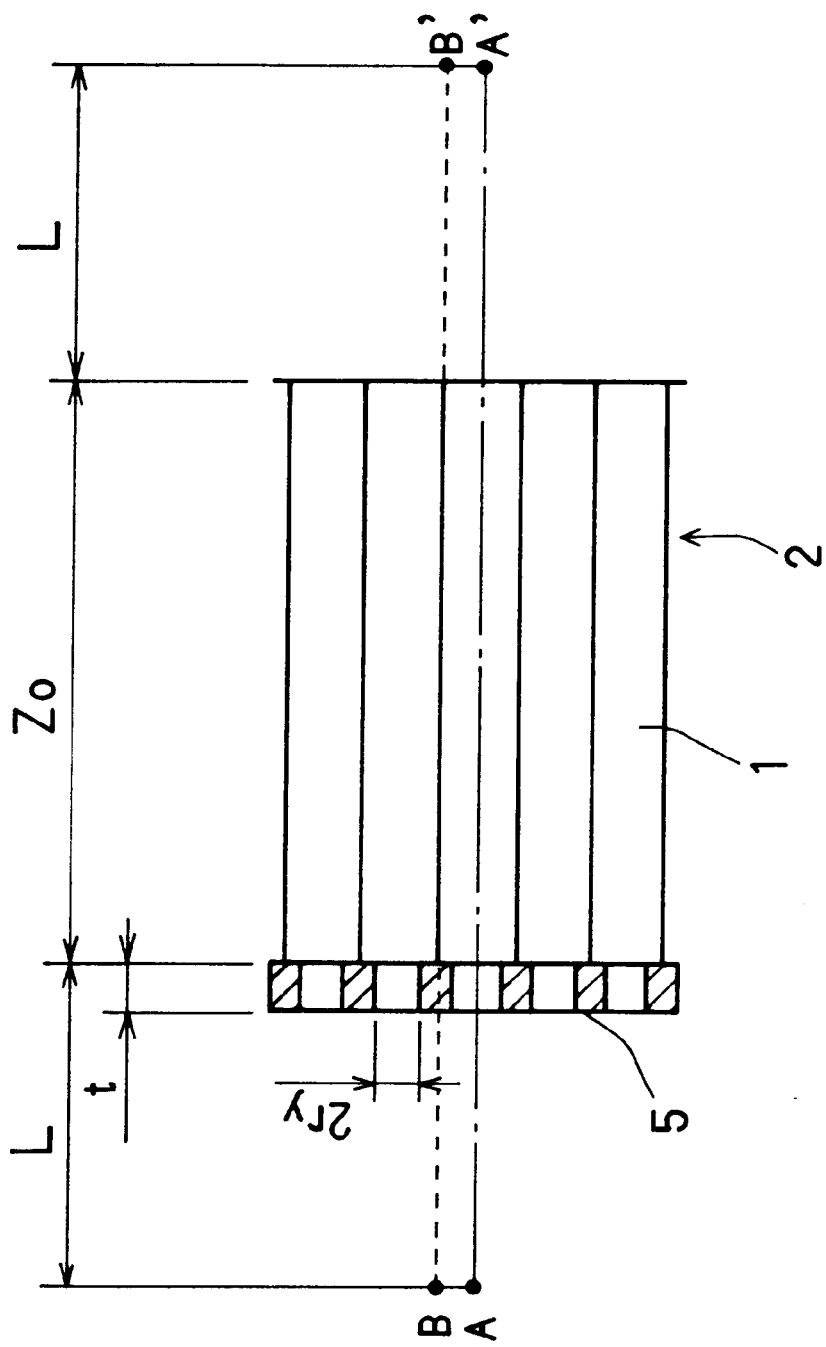
FIG. 13 is a diagram illustrating the dimensions of an optical imaging system according to the first embodiment of the present invention.
Figure 14:
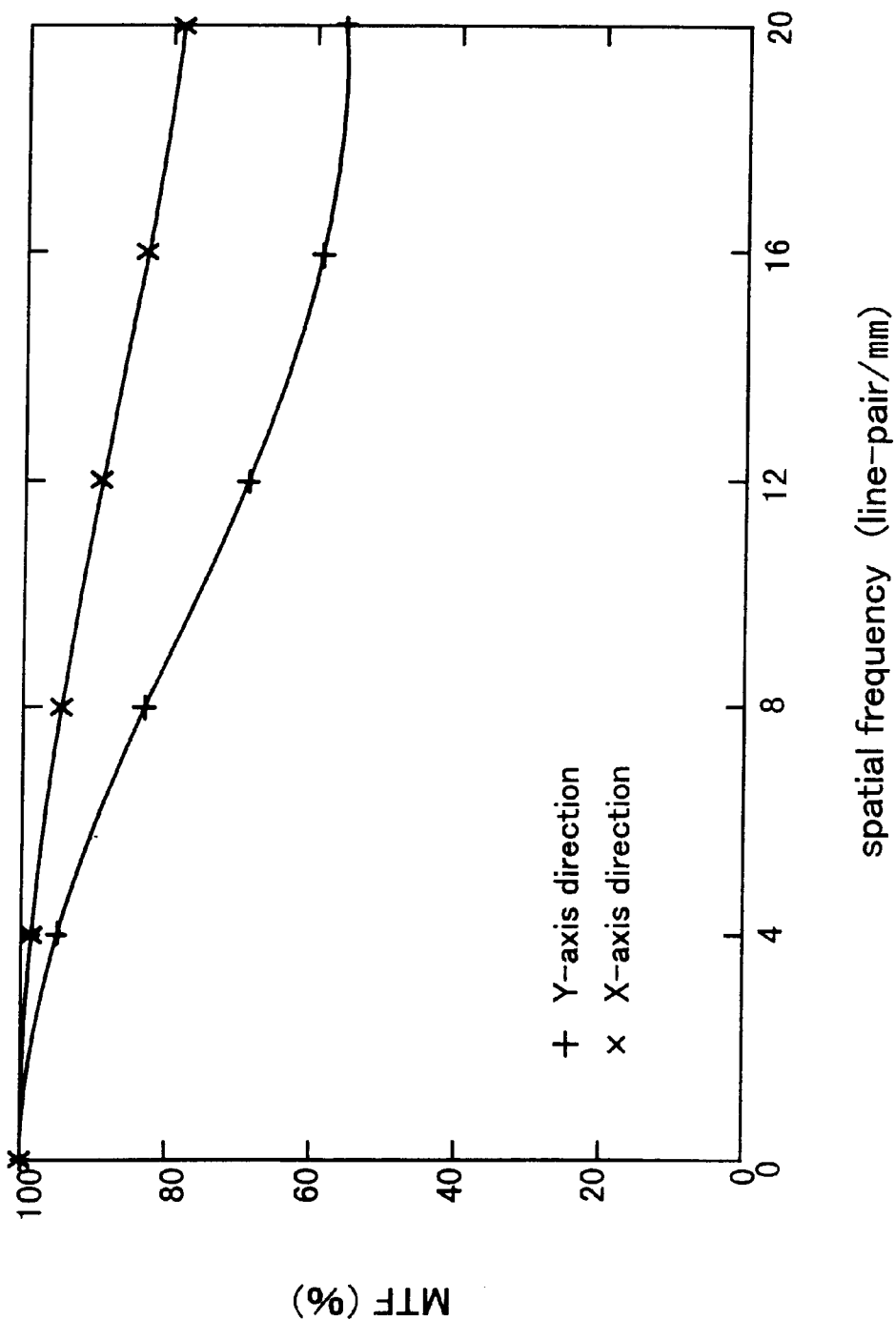
FIG. 14 is a graph showing the MTF value as a function of the spatial frequency in an optical imaging system according to the first embodiment of the present invention.
Figure 15:
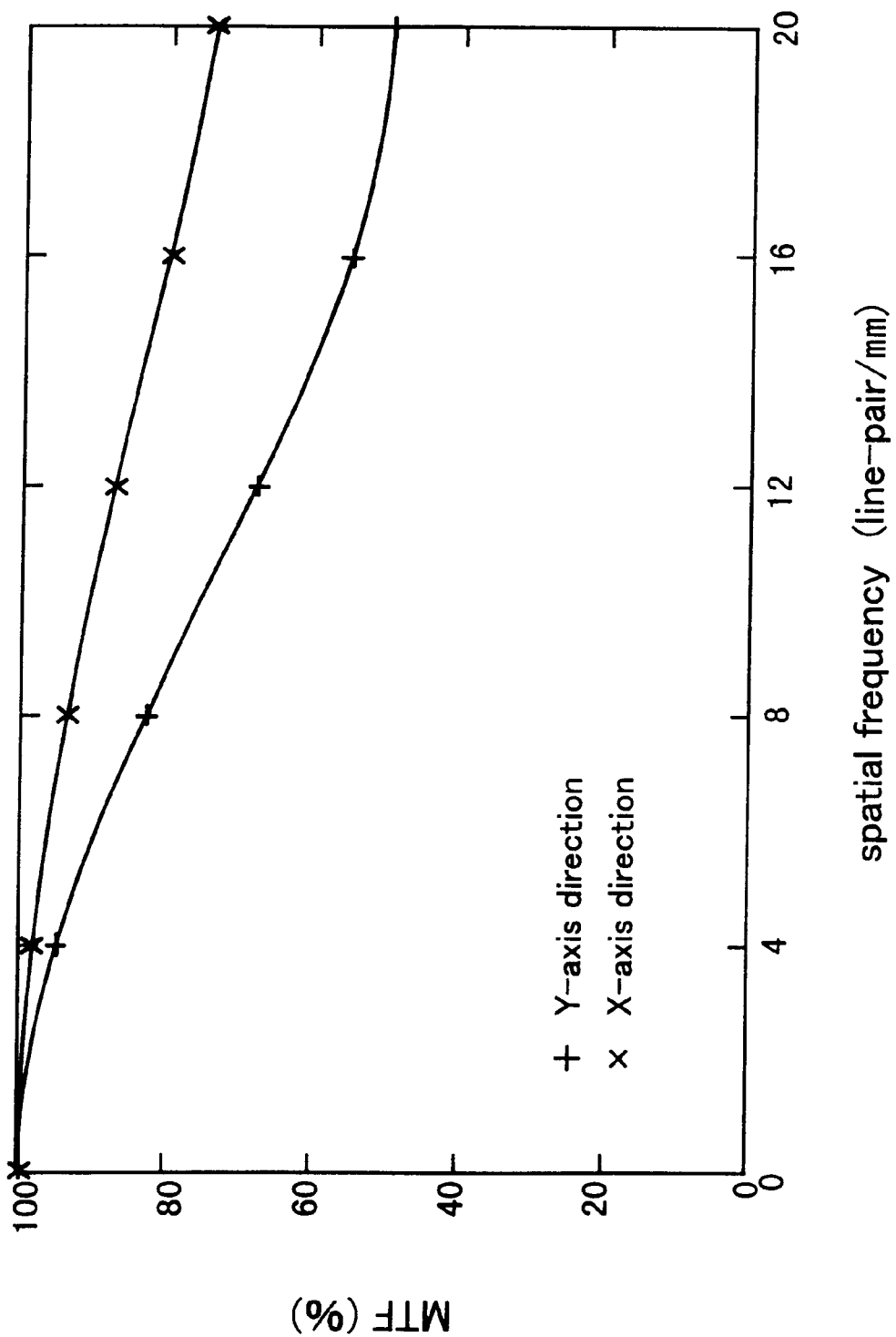
FIG. 15 is a graph showing the MTF value as a function of the spatial frequency in an optical imaging system according to the first embodiment of the present invention.
Figure 16:
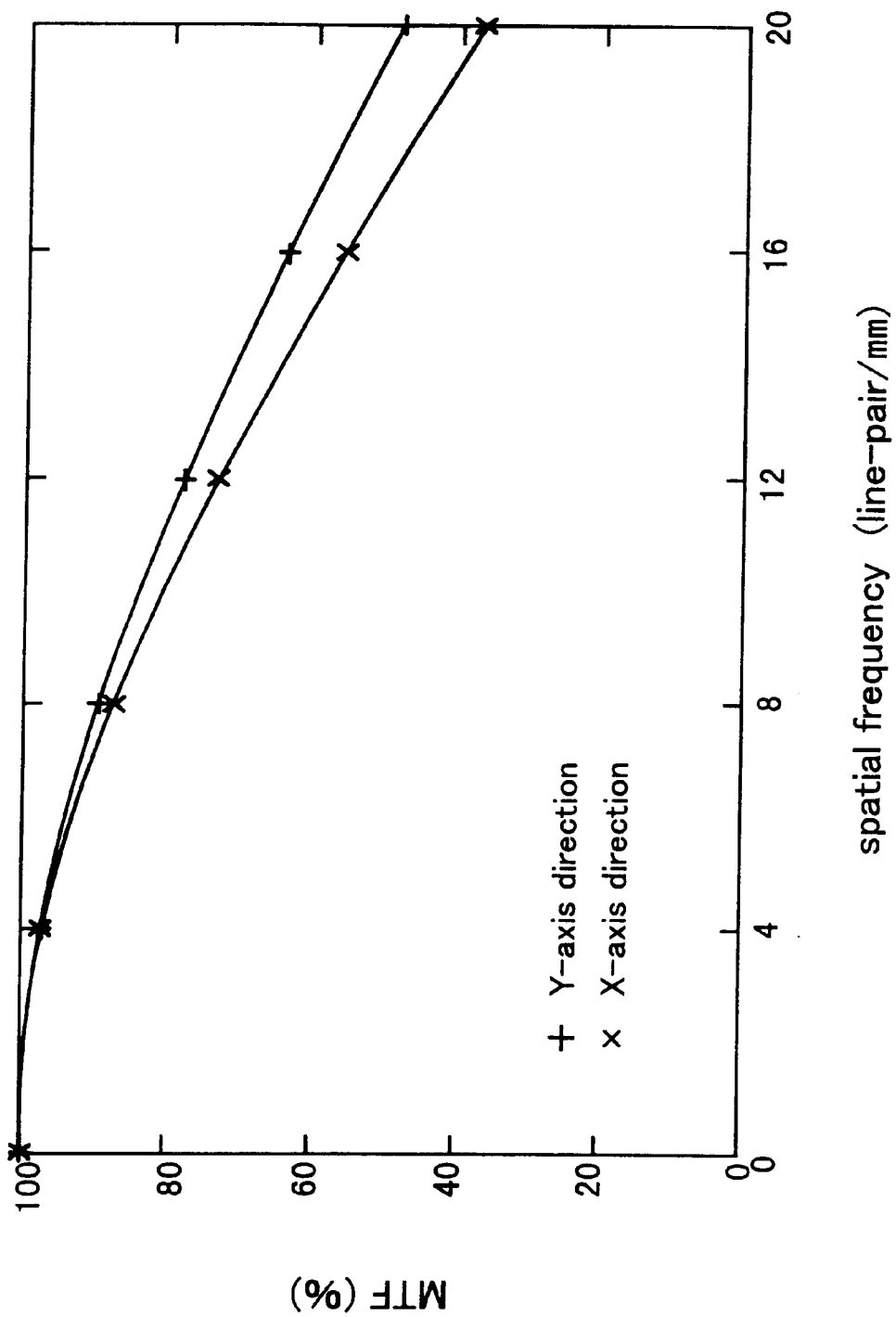
FIG. 16 is a graph showing the MTF value as a function of the spatial frequency in an optical imaging system according to the first embodiment of the present invention.
Figure 17:
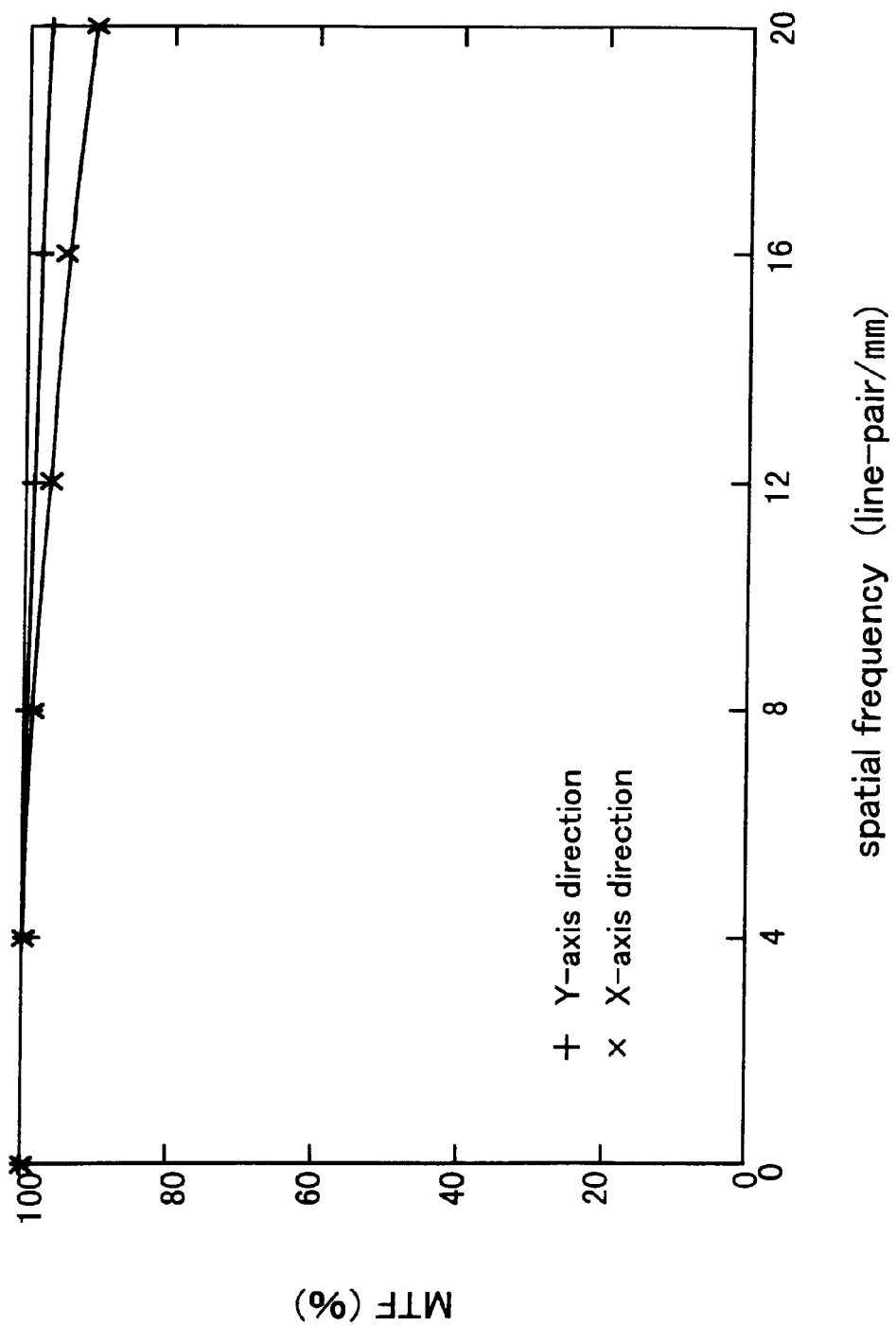
FIG. 17 is a graph showing the MTF value as a function of the spatial frequency in an optical imaging system according to the first embodiment of the present invention.
Figure 18:
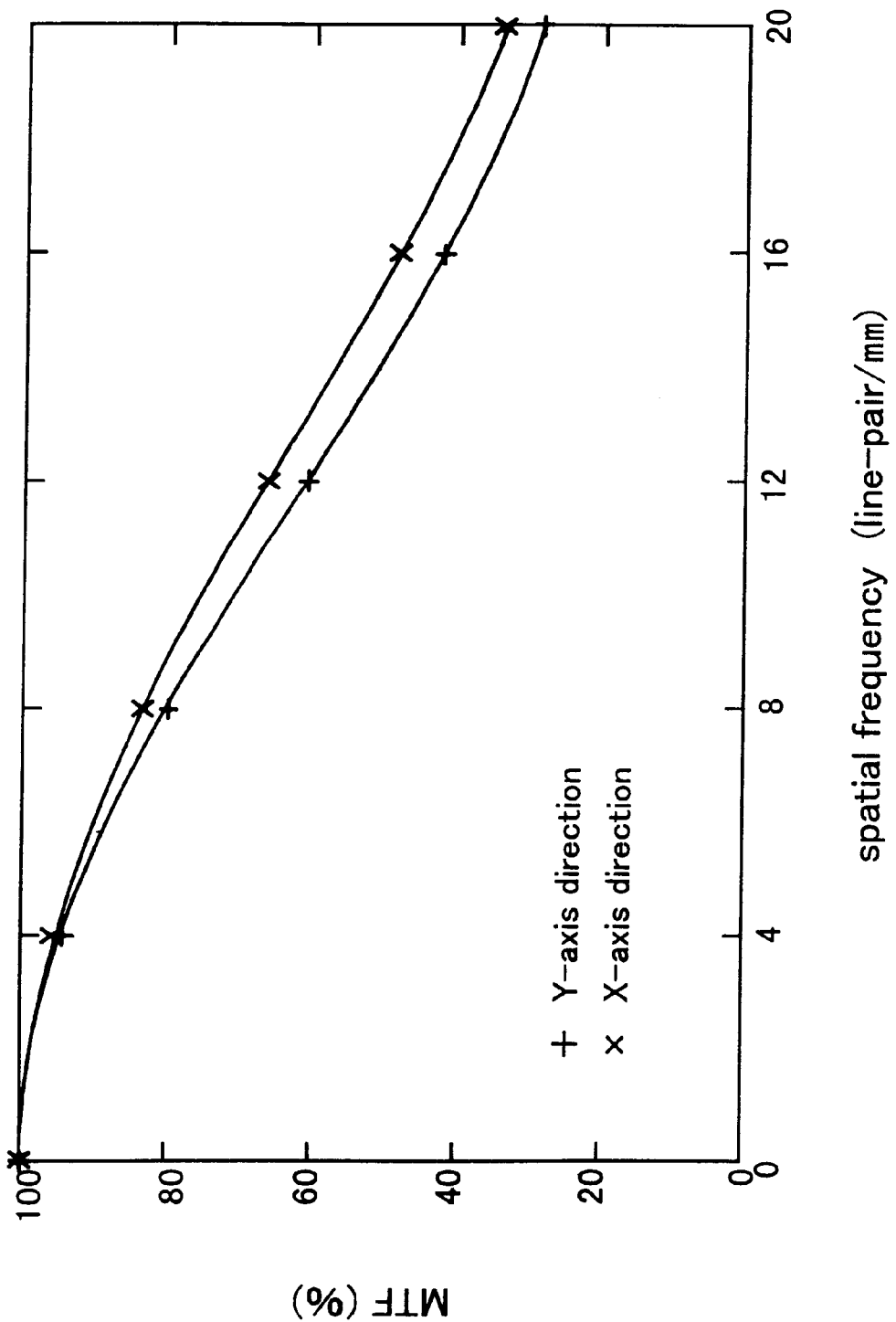
FIG. 18 is a graph showing a comparative example of the MTF value as a function of the spatial frequency in an optical imaging system according to the first embodiment of the present invention.

Rectangular aperture stops 5 with a certain thickness as shown in FIG. 13 were used, and provided only on the end faces of the rod lenses 1 on the object plane 3. The distance L between the end face (lens face) of the rod lens array 2 and the object plane 3, which is also the distance between the end face (lens face) of the rod lens array 2 and the image plane 4, the image brightness A' in FIG. 13 (which is a point on the image plane and on the optical axis of a rod lens), the image brightness at B' in FIG. 13 (which is a point on the image plane and between the optical axes of two adjacent rod lenses), and the MTF value at A' in FIG. 13 were calculated for different values of the width $2r_y$ of the apertures stops 5 ($r_y$ is the effective radius of the rod lenses 1, which are delimited by the aperture stops 5, in the Y-axis direction, that is, the longitudinal direction of the rod lens array 2), and different thicknesses t. The results of this calculation are shown in Table 1 and in FIGS. 14 to 17. The calculation results for a case where no aperture stops are provided are denoted as "Comparative Example 1" in Table 1, and are shown in FIG. 18.

TABLE 1

| | Stop Width $2r_y$ | Stop thickness t | L | Image Brightness A' | Image Brightness B' | MTF value (A') |
|---|---|---|---|---|---|---|
| Comp. Ex. 1 | no stop | — | 2.36 mm | 100 | 112 | FIG. 18 |
| Design Ex. 1 | 0.50 mm | 1.2 mm | 2.39 mm | 49 | 68 | FIG. 14 |
| Design Ex. 2 | 0.40 mm | 1.0 mm | 2.38 mm | 45 | 55 | FIG. 15 |
| Design Ex. 3 | 0.30 mm | 0.5 mm | 2.32 mm | 54 | 52 | FIG. 16 |
| Design Ex. 4 | 0.30 mm | 1.0 mm | 2.37 mm | 25 | 35 | FIG. 17 |

The image brightness was determined by the number of light rays reaching the image plane 4 during manufacture of a spot diaphragm, and is the relative value with respect to the Comparative Example 1 (image brightness at point A':100), in which no aperture stops are provided. The distance L between the end face (lens face) of the rod lens array 2 and the object plane 3, which is also the distance between the end face (lens face) of the rod lens array 2 and the image plane 4, was taken to be the value where the MTF value is the highest, so that it does not necessarily coincide with $L_0$.

As can be seen from Table 1 and FIGS. 14 to 18, providing aperture stops 5 improves the MTF value dramatically. Also, the image brightness in the Design Examples 1 to 3 can be kept at about half the image brightness of the Comparative Example 1, in which no aperture stops are provided. On the other hand, the image brightness of the Design Example 4 is very low, but its MTF value is extraordinarily good.

The resolving power (MTF value) when a rod lens array 2 with the above specifications is provided with aperture stops 5 was measured for an 8 line-pair/mm pattern, a 12 line-pair/mm pattern, and a 16 line-pair/mm pattern. Additionally, the average image brightness on the center line in the Y-axis direction on the image plane 4 was measured. For the aperture stops 5, rectangular aperture stops of a certain thickness on which a black delustered coating was formed were used, as shown in FIG. 13. These aperture stops 5 were provided only on the end face of the rod lenses 1 on the side of the object plane 3. The width $2r_y$ of the aperture stops 5 was 0.3 mm, and the thickness t of the aperture stops 5 was 0.5 mm. To measure the MTF value, a linear CCD (element interval: 7 μm) was arranged at the focal position, and the average MTF value and the average brightness were measured in a measurement range of about 3.5 mm (512 measured points). For comparison, the MTF value and the image brightness were also measured for the same rod lens array without aperture stops. The measurement results are shown in Table 2:

TABLE 2

| MTF (%) | without rectangular stops | with rectangular stops |
|---|---|---|
| 8–1 p/mm | 66.86% | 78.57% |
| 12–1 p/mm | 38.83% | 67.61% |
| 16–1 p/mm | 30.70% | 54.20% |
| brightness | 100 | 44.6 |

As can be seen from Table 2, providing aperture stops 5 improves the MTF value considerably, although the image brightness is reduced by half.

Second Embodiment

Figure 19:
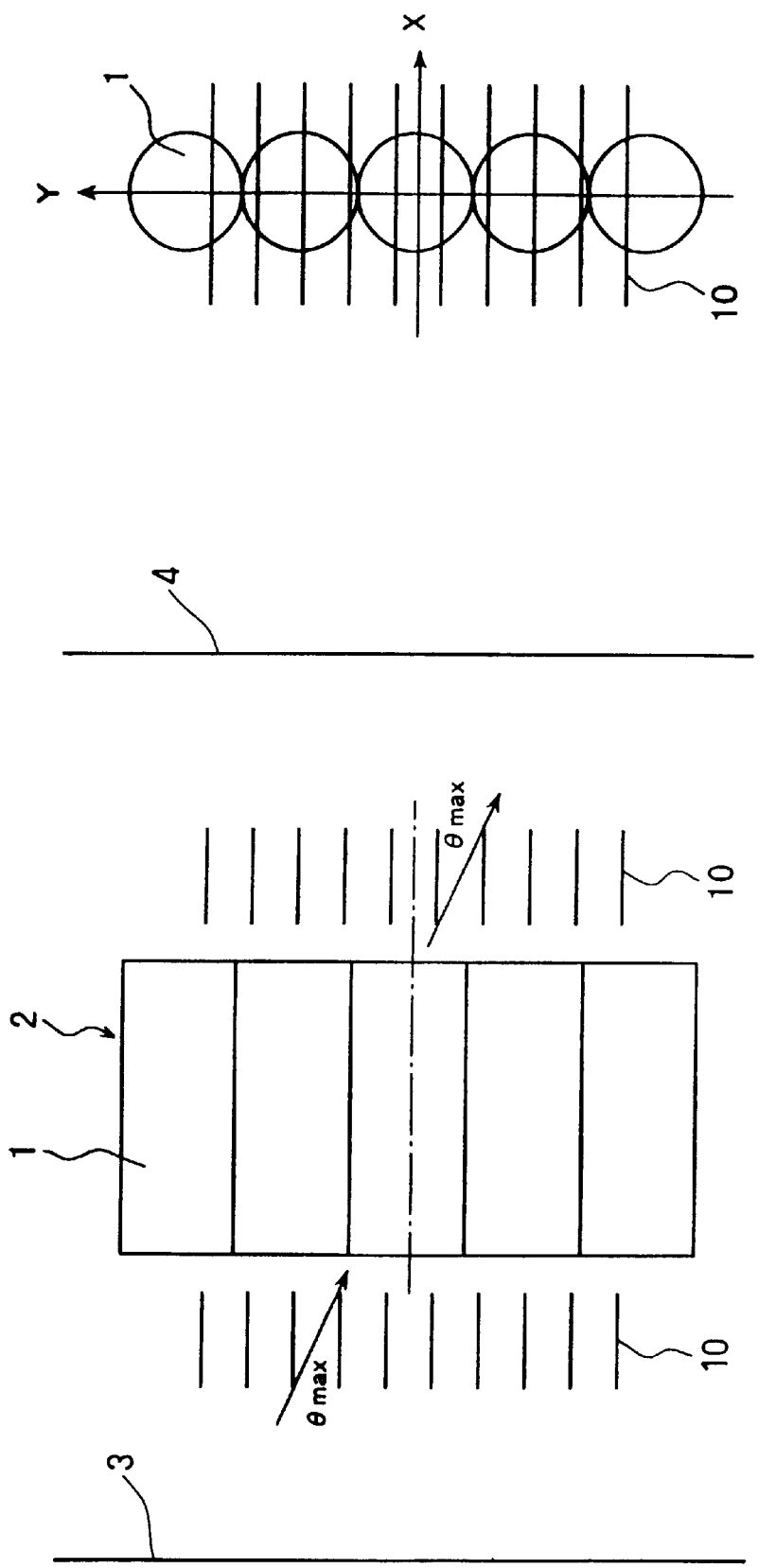
FIG. 19 is a layout drawing showing a configuration of an optical imaging system according to a second embodiment of the present invention.

FIG. 19 is a layout drawing showing a configuration of an optical imaging system according to a second embodiment of the present invention.

Also in this embodiment, as in the first embodiment, a plurality of columnar rod lenses 1 with a refractive index distribution in the radial direction is arranged in one row in a rod lens array 2 for one-to-one imaging with their optical axes 1*a* in parallel (see FIGS. 1 and 2).

As is shown in FIG. 19, flat light-blocking plates 10 are arranged periodically in the longitudinal direction (Y-axis direction) of the rod lens array 2 on the side of the object plane 3 and on the side of the image plane 4 of the rod lens array 2. The normals on the light-blocking plates 10 point in the Y-axis direction. By providing such light-blocking plates 10 on the side of the object plane 3 and on the side of the image plane 4 of the rod lens array 2, light rays are blocked (in the Y-axis direction of the rod lens array 2) that pass through the lens faces of the rod lenses 1 at an angle that is larger than a predetermined angle $θ_{max}$ with respect to the optical axes 1*a* of the rod lenses 1. Thus, the image portion with a large image surface curvature is eliminated, which improves the resolving power when using the rod lens array 2. With this configuration, the image surface curvature and the aperture in the X-axis direction (i.e. the direction perpendicular to the longitudinal direction of the rod lens array 2) are the same as without the light-blocking plates 10. but since the image utilized by a scanning device or the like is limited to a linear portion in the Y-axis direction, the influence of the image surface curvature in the X-axis direction can be ignored.

Moreover, in this configuration, light-blocking plates 10 are provided both between the rod lens array 2 and the object plane 3 and between the rod lens array 2 and the image plane 4, but the present invention is not limited to this configuration. It is also possible to provide the light-blocking plates 10 in either the spaces between the rod lens array 2 and the object plane 3 or the spaces between the rod lens array 2 and the image plane 4, thereby simplifying the configuration.

In order to reduce loss of light, it is preferable that the light-blocking plates 10 are as thin as possible, for example in the range of not more than ⅕ of the pitch between the light-blocking plates 10.

It is not necessary that the pitch of the light-blocking plates 10 matches the pitch of the rod lenses 1, but in order to avoid periodic irregularities of the image brightness, it is preferable that the pitch of the light-blocking plates 10 is smaller than the pitch of the rod lenses 1. In Design Example 5, which is explained below, the pitch of the rod lenses 1 is 0.563 mm, whereas the pitch of the light-blocking plates 10 is set to 0.2 mm.

For example, if an air layer of thickness T is replaced by a glass with a refractive index n, it may be necessary to adjust the thickness of the glass layer to n·T.

Figure 22:
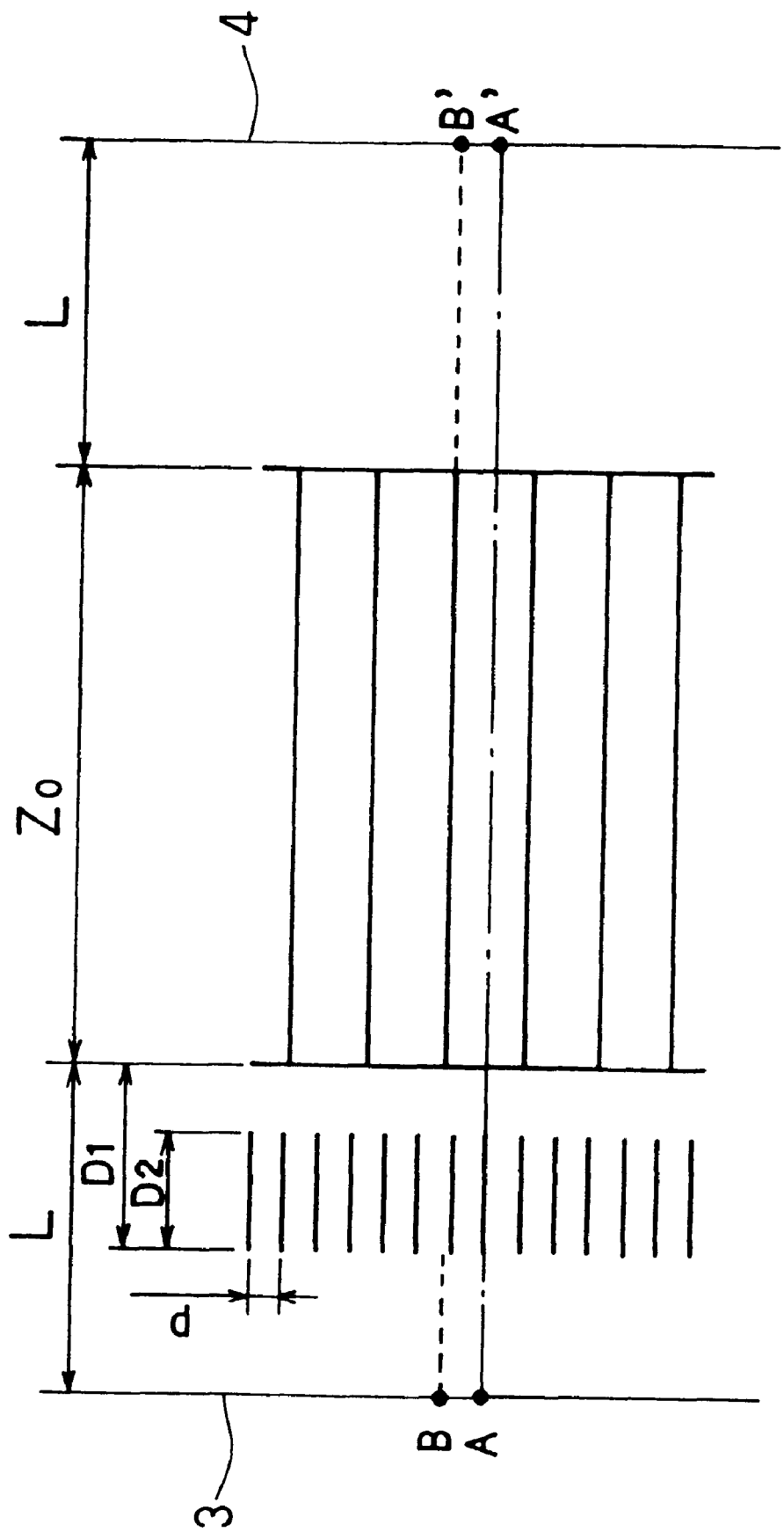
FIG. 22 is a diagram illustrating the dimensions of an optical imaging system according to the second embodiment of the present invention.

For the rod lens array 2, the same arrays as in the above-noted Design Examples 1 to 4 of the first embodiment were used, and the light-blocking plates 10 were arranged as shown in FIG. 22. That is, the light blocking plates 10 were provided only on the side of the object plane 3 of the rod lenses 1, and arranged at a distance from the rod lenses 1. In FIG. 22, $Z_0$ is the length of the rod lenses 1, L is the distance between the end face (lens face) of the rod lens array 2 and the object plane 3, which is also the distance between the end face (lens face) of the rod lens array 2 and the image plane 3, p is the pitch of the light-blocking plates 10. $D_1$ is the distance between the end face (lens face) of the rod lenses 1 and the edge of the light-blocking plates 10 on the side of the object plane 3, and $D_2$ is the length of the light-blocking plates 10 in the direction of the optical axis of the rod lenses.

Figure 23:
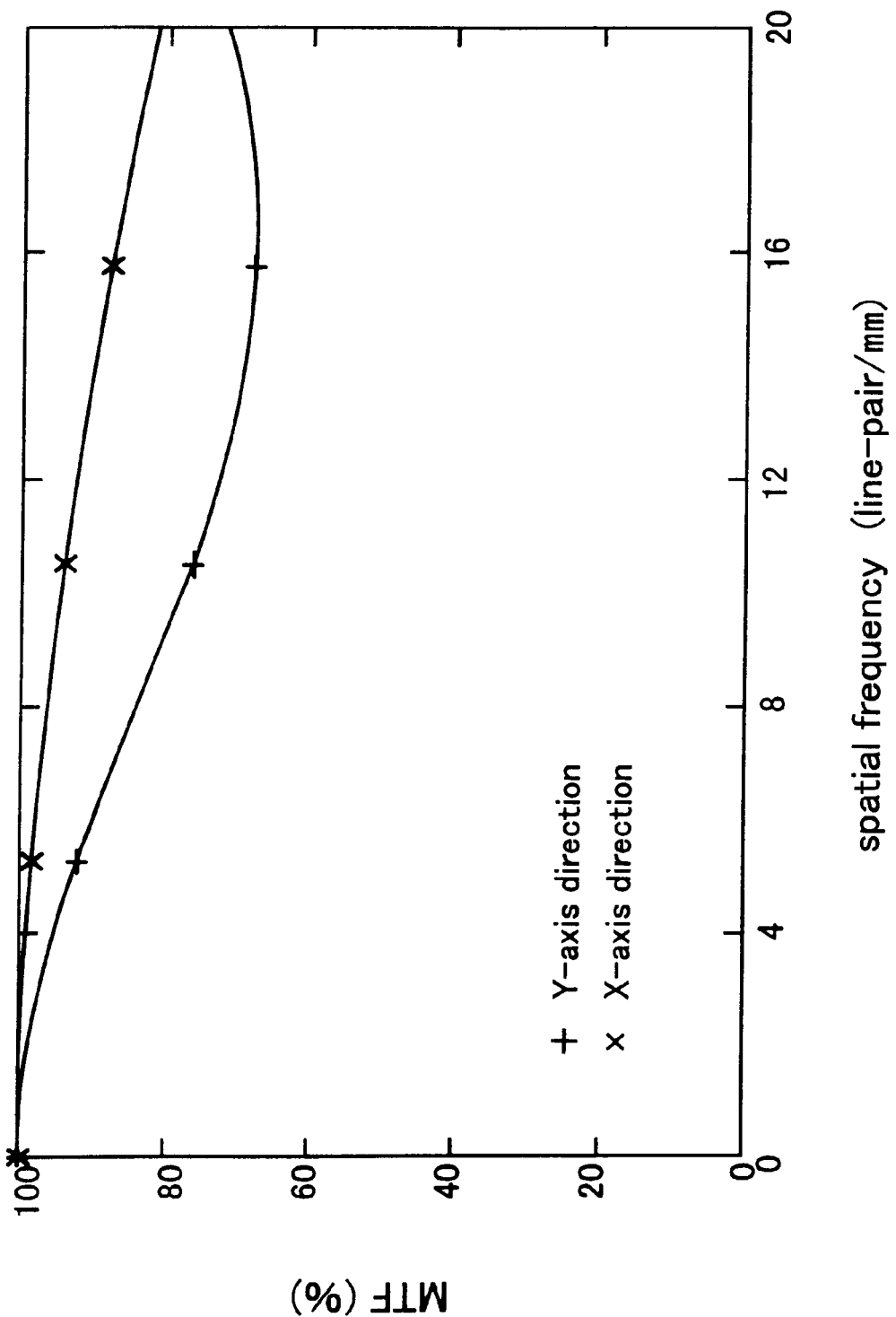
FIG. 23 is a graph showing the MTF value as a function of the spatial frequency in an optical imaging system according to the second embodiment of the present invention.

TABLE 3 lists a design example of this embodiment:

|  | D1 | D2 | pitch p | thickness of light-blocking plates | L | image brightness A' | B' | MTF value (A') |
|---|---|---|---|---|---|---|---|---|
| Design Ex. 5 | 1.5 mm | 1.1 mm | 0.2 mm | 0.02 mm | 2.37 mm | 22 | 29 | FIG. 23 |

It is preferable that the length of the light-blocking plates 10 in the direction of the optical axis of the lenses is in the range of 1 to 10 times the pitch length (referred to as "$P_s$") between the light-blocking plates 10. If the length of the light-blocking plates 10 in the direction of the optical axis of the lenses is less than $1P_s$, there is almost no effect of cutting the image portion with the large image surface curvature. On the other hand, if the length of the light-blocking plates 10 in the direction of the optical axis of the lens exceeds $10 P_s$, the light amount of the image is reduced considerably. Also, to prevent irregularities of the light amount of the light image is reduced considerably. Also, to prevent irrgularities of the light amount on the image surface, it is preferably that the distance between the light-bloking plates 10 and the rod lens array 2 is at least 1 $P_s$. However, if this distance is too large, the gap between the light-blocking plates 10 and the image plane 4 or the object plane 3 becomes to narrow, and there is the danger that there is no space for arranging an illumination device or the like, so that it is preferable to ensure that the gap between the light-blocking plates 10 and the image plane 4 or the object plane 3 is at least $1P_s$.

Figure 20:
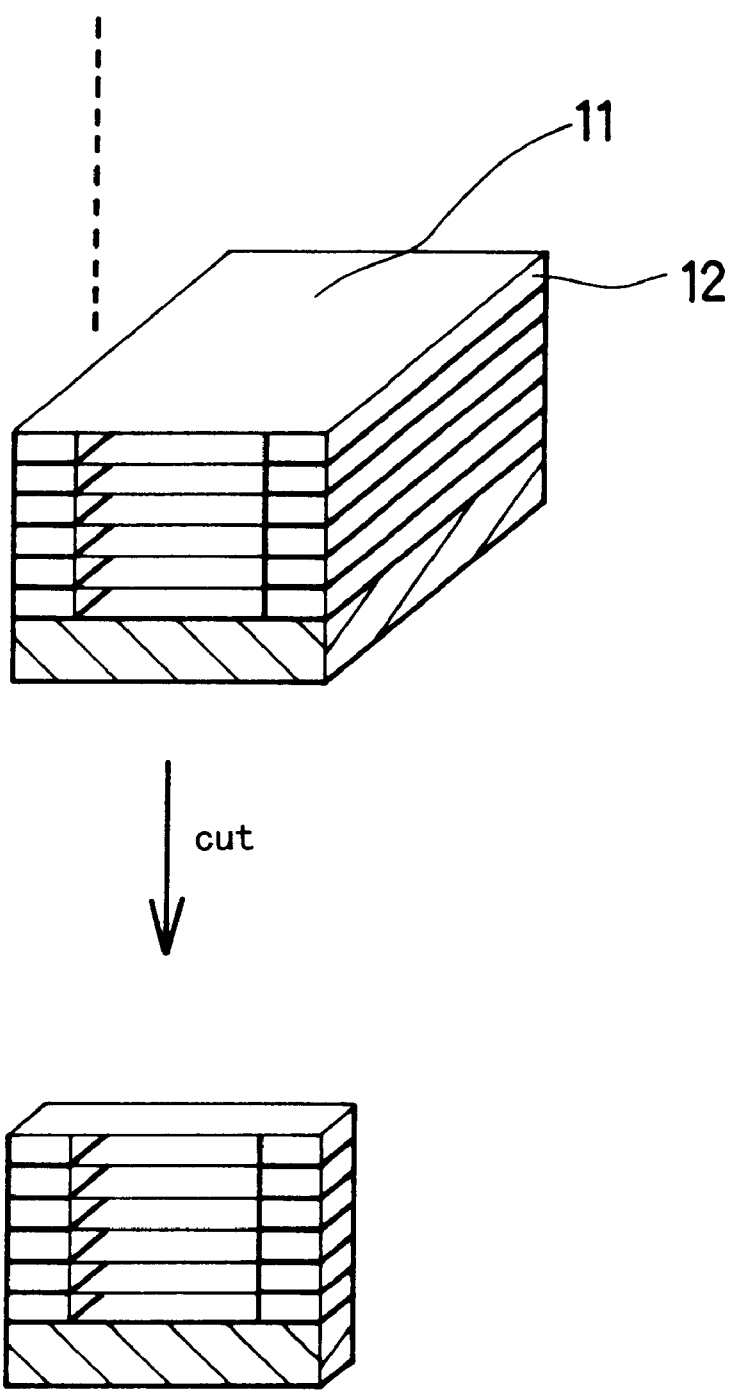
FIG. 20 is a perspective view illustrating a method for manufacturing the light-blocking plates used in an optical imaging system according to the second embodiment of the present invention.
Figure 21:
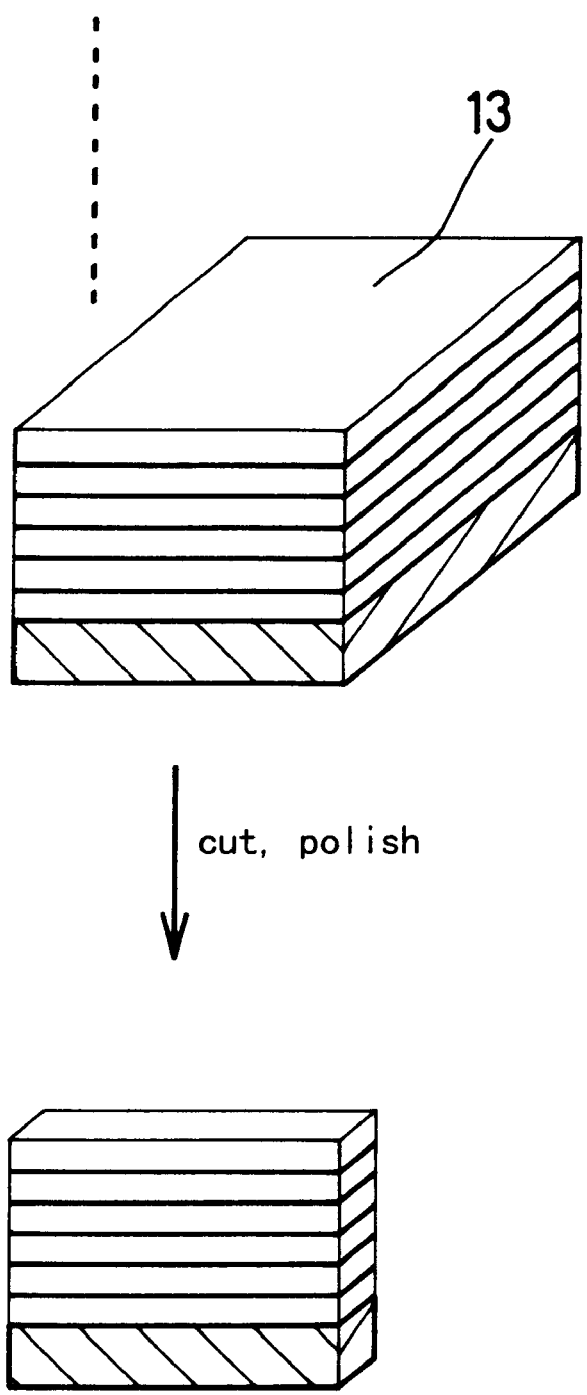
FIG. 21 is a perspective view illustrating another method for manufacturing the light-blocking plates used in an optical imaging system according to the second embodiment of the present invention.

The light-blocking plates 10 in this embodiment can be made, for example, by the following methods. A first method is to align and glue together thin plates 11 separated by spacers 12 of a certain thickness, and cut them into a certain thickness, as shown in FIG. 20. The thin plates 11 can be, for example, made of metal or plastic, and have a black surface. A second method is to stack and glue together several transparent plates 13 made of glass, the surface of which has been blackened and delustered, cut them into a certain thickness, and polish their end faces, as shown in FIG. 21. It should be noted that with this second method, it may be necessary to take into account the refractive index of the glass and adjust the dimensions of the elements accordingly.

In this design example, the image brightness at A' in FIG. 22 (which is a point on the image plane and on the optical axis of a rod lens), the image brightness at B' in FIG. 22 (which is a point on the image plane and between the optical axes of two adjacent rod lenses), and the MTF value at A' in FIG. 22 were calculated. The results of this calculation are shown in above Table 3 and in FIG. 23.

The image brightness was determined by the number of light rays reaching the image plane 4 during manufacture of a spot diaphragm, and is the relative value with respect to the case without light-blocking plates 10 (image brightness at point A': 100).

As can be seen in Table 3 and FIG. 23, providing light-blocking plates 10 improves the MTF value dramatically (see Comparative Example 1 in Table 1 of the first embodiment and FIG. 18), although the image brightness is reduced.

Third Embodiment

Figure 24:
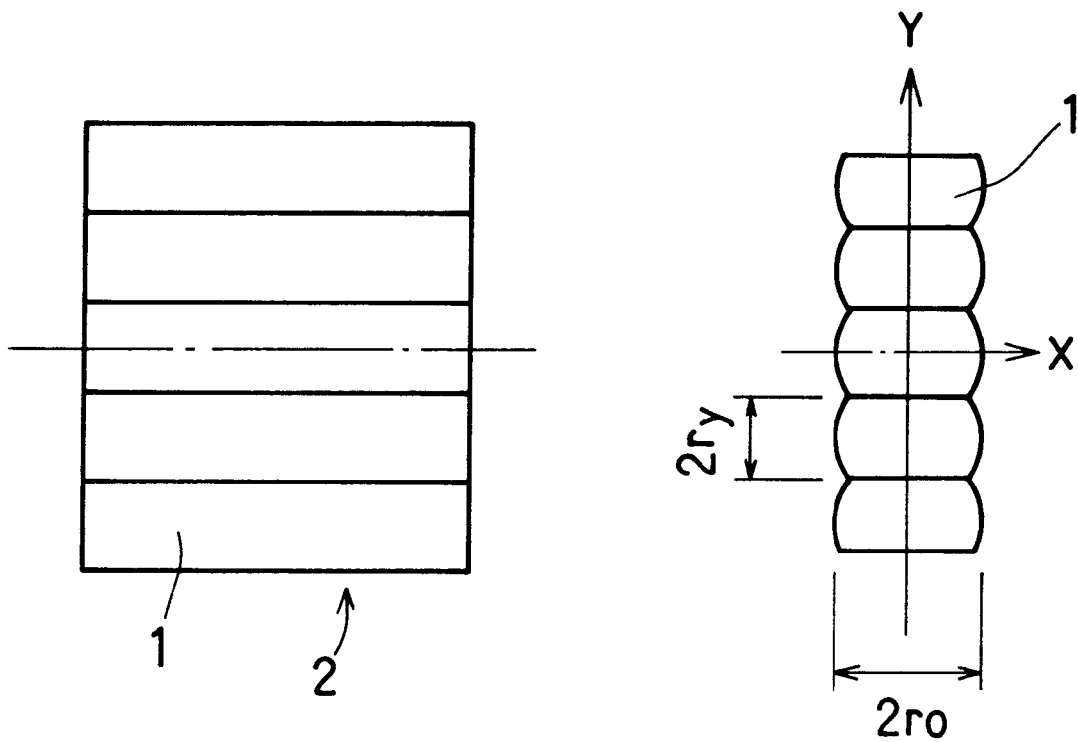
FIG. 24 is a layout drawing showing a configuration of an optical imaging system according to a third embodiment of the present invention.

FIG. 24 is a layout drawing showing a configuration of an optical imaging system according to a third embodiment of the present invention.

Also in this embodiment, a plurality of columnar rod lenses 1 with a refractive index distribution in the radial direction is arranged in one row in a rod lens array 2 for one-to-one imaging with their optical axes 1a in parallel (see FIGS. 1 and 2). However, the shape of the rod lenses 1 of this embodiment is different from the shape in the first embodiment. That is, the edge portions of the rod lenses 1 in the longitudinal direction (Y-axis direction of the rod lens array 2) have been shaved away symmetrically to the optical axis 1a of the rod lenses 1, as shown in FIG. 24, so that the rod lenses 1 are shorter in the Y-axis direction. Then, by joining the shaved faces of the rod lenses 1, a rod lens array 2 arranged in one row is formed. In order to avoid stray light due to transmission and total reflection, the junction faces are processed with grinding or a black delustering coating.

Thus, by shaving off the edge portions of the rod lenses 1 in the longitudinal direction (Y-axis direction) of the rod lens array 2 along the optical axis 1a of the rod lenses 1, light rays are blocked (in the Y-axis direction) that pass through the lens faces of the rod lenses 1 at an angle that is larger than a predetermined angle with respect to the optical axes 1a of the rod lenses 1 (i.e. the aperture angle θ is reduced as in the above-noted first embodiment of the present invention, so that the image portion with large image surface curvature is eliminated, and the resolving power when used as a rod lens array 2 is improved). Additionally, shaving off a portion of the rod lenses 1 increases the density of the rod lenses 1 in the longitudinal direction of the lens array, so that the image brightness decreases only slightly. Furthermore, because the same effect as in the above-noted first embodiment can be attained without using special elements such as aperture stops, the optical imaging system is more easily assembled. In this case, the aperture and the image surface curvature in the X-axis direction (i.e. the direction perpendicular to the longitudinal direction of the rod lens array 2) is the same when the edge portions of the rod lenses 1 in the longitudinal direction (Y-axis direction) of the rod lens array 2 have not been shaved off along the optical axis 1a of the rod lens array 1, but since the image utilized by a scanning device or the like is limited to a linear portion in the Y-axis direction, the influence of the image surface curvature in the X-axis direction can be ignored.

It is preferable that $r_y/r_0$ is in the range given by $0.1 \leq r_y/r_0 \leq 0.8$, wherein $r_0$ is the effective radius of the rod lenses 1 (i.e. the radius of the portion functioning as a lens), and $2r_y$ is the length of the rod lenses 1 in the Y-axis direction after both edge portions of the rod lenses 1 in the longitudinal direction (Y-axis direction) of the rod lens array 2 have been shaved off along the optical axis 1a of the rod lenses 1. If $r_y/r_0$ is less than 0.1, the rod lenses 1 become too narrow and the number of rod lenses 1 that are necessary for the rod lens array 2 becomes too large, and if $r_0/r_y$ exceeds 0.8, the remaining image surface curvature becomes large, so that the resolving power deteriorates.

Table 4 lists design examples of this embodiment. Except for the specifications listed in Table 4, the specifications for the rod lenses are the same as for the Design Examples 1 to 4 of the first embodiment.

TABLE 4

Figure 25:
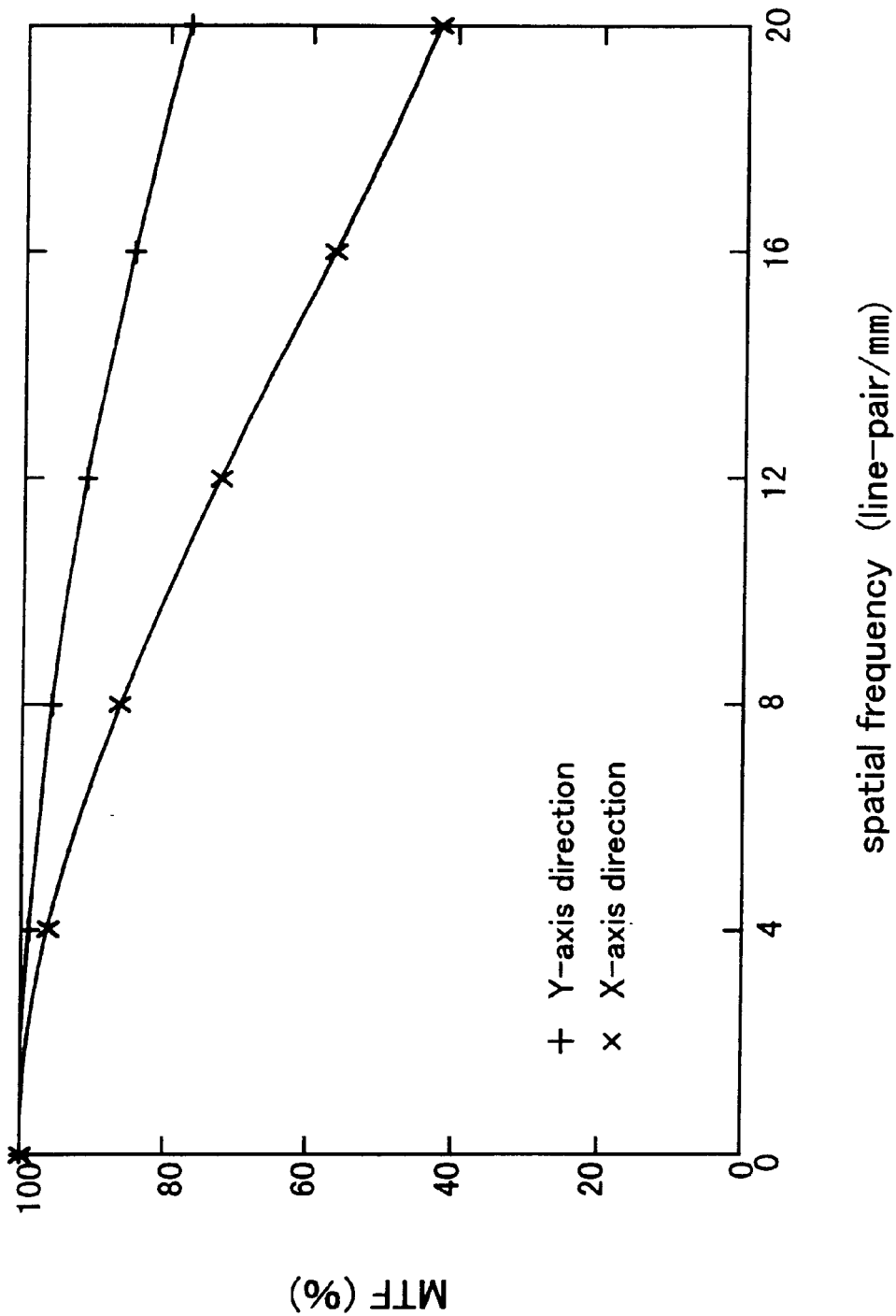
FIG. 25 is a graph showing the MTF value as a function of the spatial frequency in an optical imaging system according to the third embodiment of the present invention.
Figure 26:
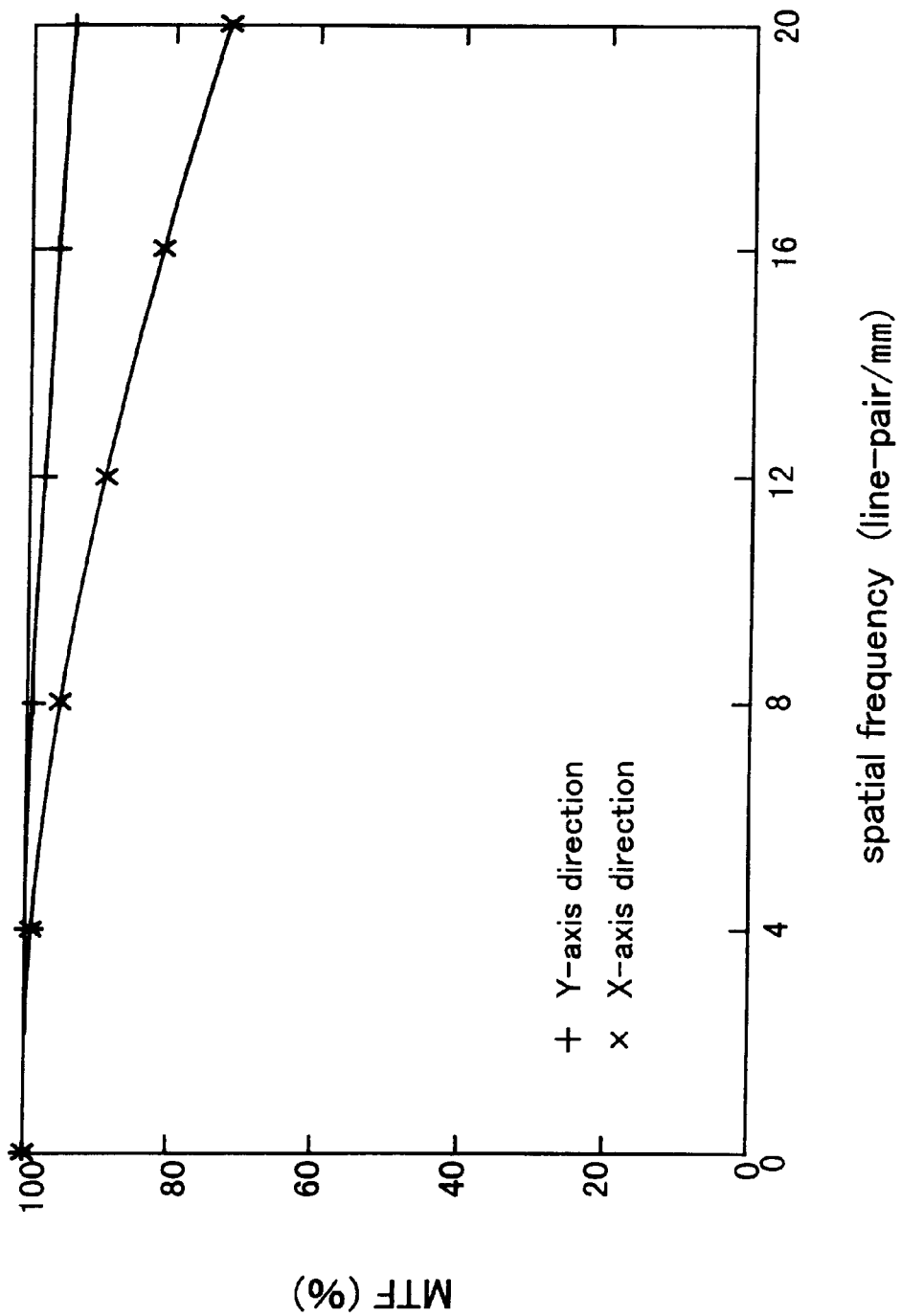
FIG. 26 is a graph showing the MTF value as a function of the spatial frequency in an optical imaging system according to the third embodiment of the present invention.

| lens width | | | image brightness | | MTF |
|---|---|---|---|---|---|
| $2r_y$ | $r_y/r_0$ | L | A' | B' | value (B') |
| Design Ex. 6 0.4 mm | 0.710 | 2.32 mm | 88 | 97 | FIG. 25 |
| Design Ex. 7 0.3 mm | 0.533 | 2.34 mm | 68 | 76 | FIG. 26 |

Same as in the second embodiment, the image brightness at the point corresponding to A' in FIG. 22, the image brightness at the point corresponding to B' in FIG. 22, and the MTF value the point corresponding to B' in FIG. 22 were calculated. The results of this calculation are shown in above Table 4 and in FIGS. 25 and 26.

The image brightness was determined by the number of light rays reaching the image plane 4 during manufacture of a spot diaphragm, and is the relative value with respect to the case that the two edge portions of the rod lenses 1 in the longitudinal direction (Y-axis direction) of the rod lens array 2 have not been shaved off along the optical axis 1a of the rod lenses 1 (in this case, image brightness at point A': 100).

As can be seen in Table 4 and FIGS. 25 and 26, shaving off the two edge portions of the rod lenses 1 in the longitudinal direction (Y-axis direction) of the rod lens array 2 along the optical axis 1a of the rod lenses 1 improves the MTF value considerably while maintaining a high image brightness.

Fourth Embodiment

Figure 27:
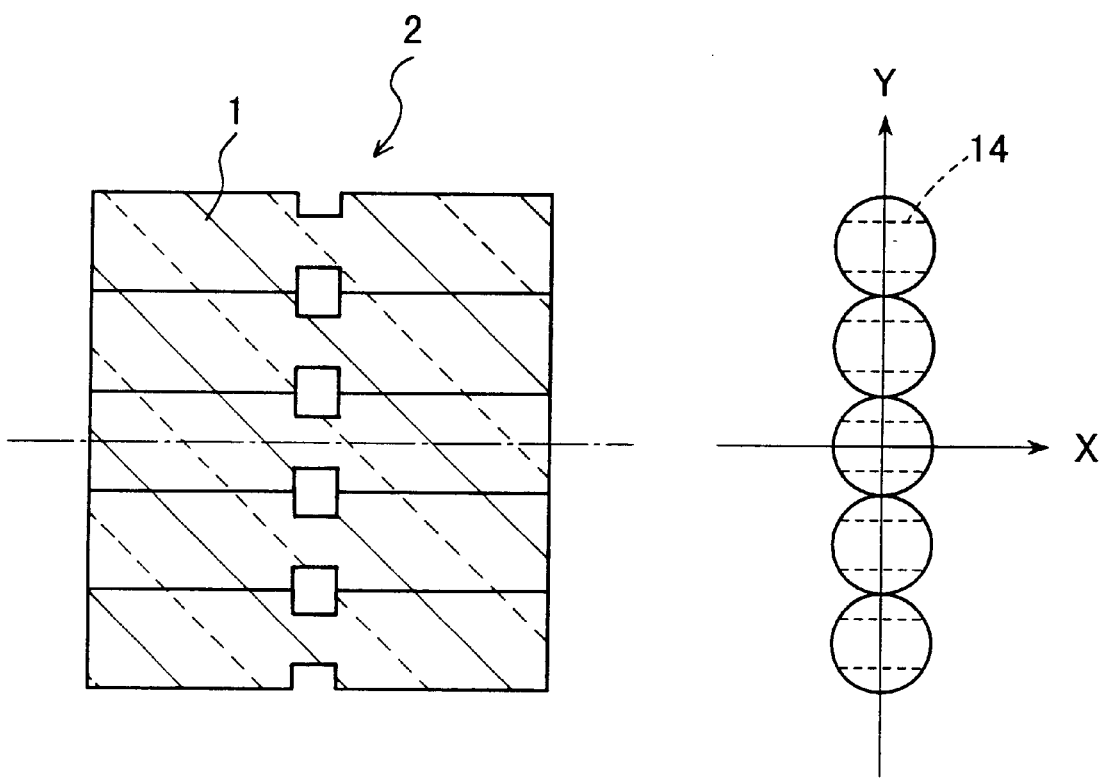
FIG. 27 is a layout drawing showing a configuration of an optical imaging system according to a fourth embodiment of the present invention.
Figure 28:
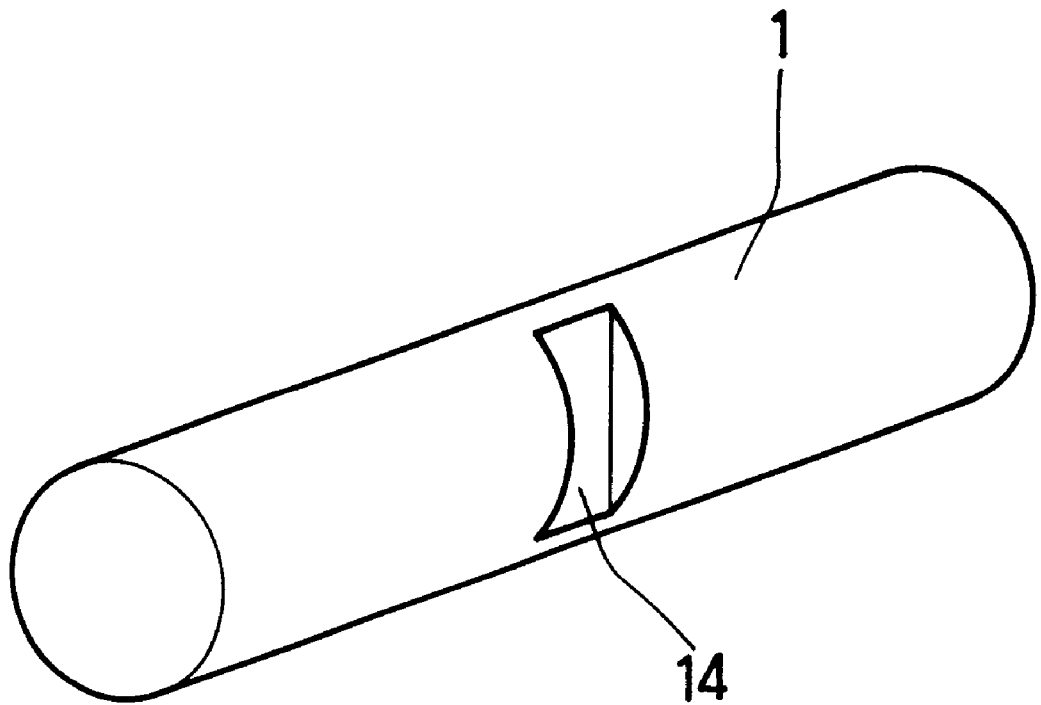
FIG. 28 is a perspective view showing the rod lenses used in an optical imaging system according to the fourth embodiment of the present invention.

FIG. 27 is a layout drawing showing a configuration of an optical imaging system according to a fourth embodiment of the present invention. FIG. 28 is a perspective view of a rod lens used in this optical imaging system.

Also in this embodiment, a plurality of rod lenses 1 with a refractive index distribution in the radial direction is arranged in one row in a rod lens array 2 for one-to-one imaging with their optical axes 1a in parallel (see FIGS. 1 and 2). However, the shape of the rod lenses 1 of this embodiment is different from the shape in the first embodiment. That is, a pair of cut-outs 14 opposing each other are provided in a center portion of the rod lenses 1 in the longitudinal direction of the rod lenses 1, as shown in FIGS. 27 and 28. When assembling the rod lens array 2, the opposing faces of the pairs of cut-outs 14 of the rod lenses 1 are arranged so that they face the longitudinal direction (Y-axis direction) of the rod lens array 2. Also, when assembling the rod lens array 2, a resin or the like is filled into the cut-outs 14 of the rod lenses 1, so that, as in the first embodiment, light rays are blocked (in the Y-axis direction) that enter the lens faces of the rod lenses 1 at an angle that is larger than a predetermined angle with respect to the optical axes 1a of the rod lenses 1, which lead to the image portion with a large image curvature, and the aperture angle θ is reduced. As a result, the image portion with a large image surface curvature is eliminated, which improves the resolving power when using the rod lens array 2.

It is preferable that the cutting depth of the cut-outs 14 is the same as the shaving height of the rod lenses 1 in the third embodiment. In other words, it is preferable that $r_y/r_0$ is in the range given by $0.1 \leq r_y/r_0 \leq 0.8$, wherein $r_0$ is the effective radius of the rod lenses 1 (i.e. the radius of the portion functioning as a lens), and $2r_y$ is the distance between the opposing faces of a pair of cut-outs 14.

Figure 29:
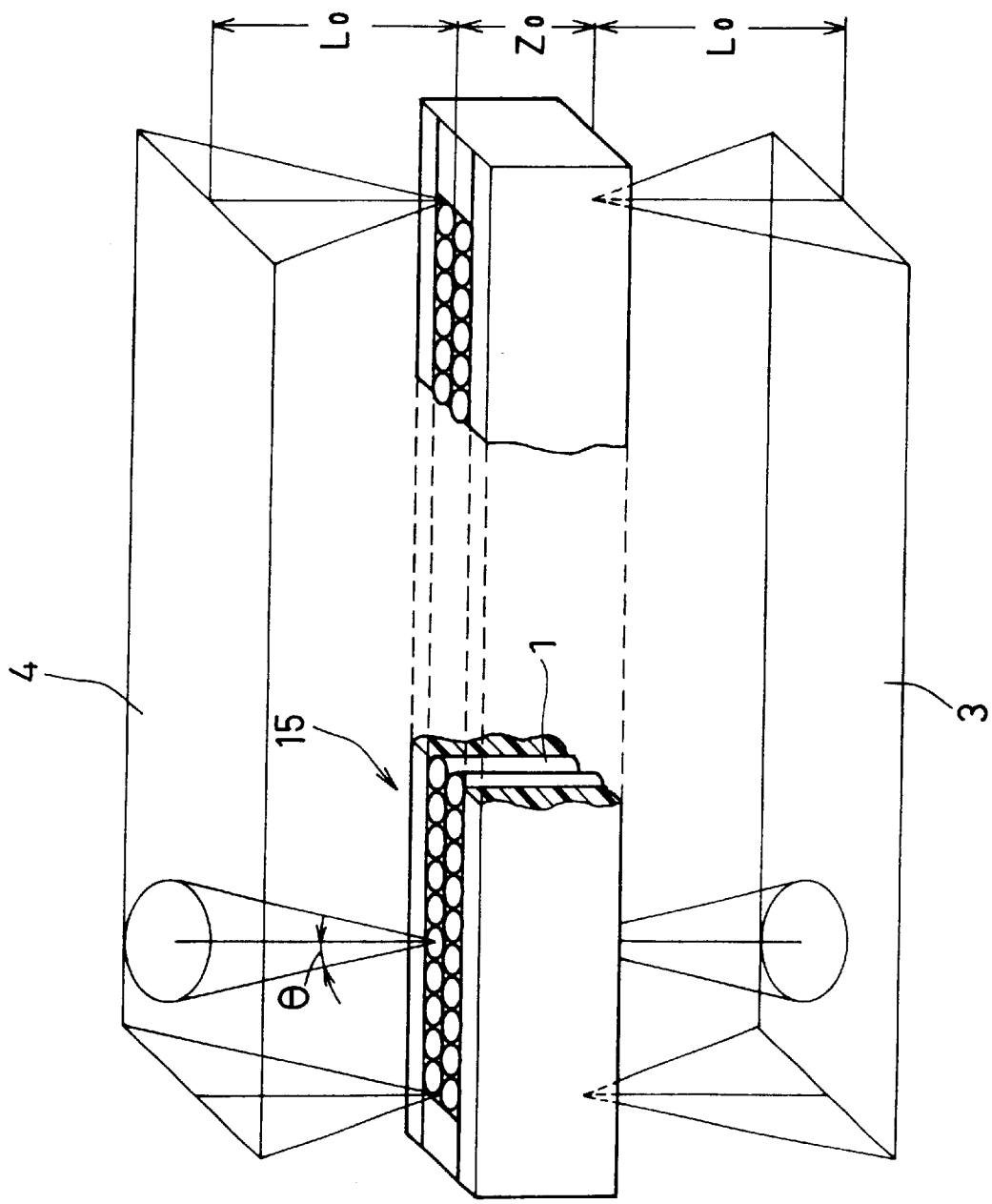
FIG. 29 is a perspective view showing another configuration of the rod lens array used in an optical imaging system according to the first to third embodiment of the present invention.
Figure 30:
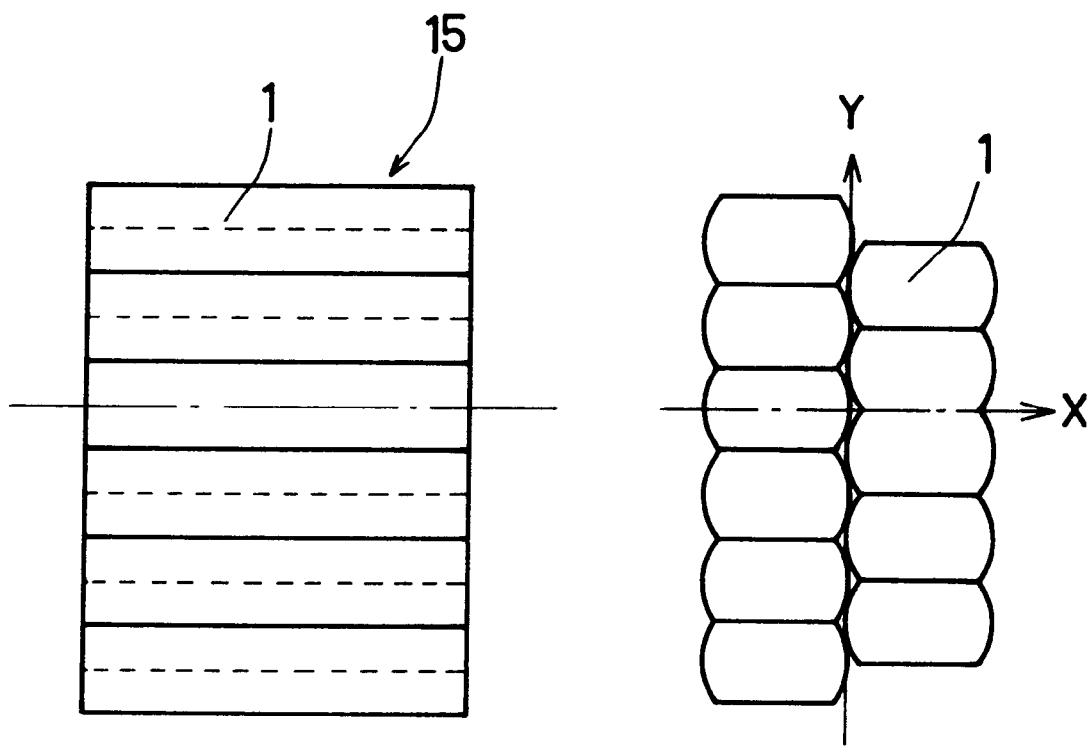
FIG. 30 is a perspective view showing another configuration of the rod lens array used in an optical imaging system according to the fourth embodiment of the present invention.

The first to fourth embodiments have been explained by way of examples in which the rod lenses 1 have a refractive index distribution in the radial direction, and are arranged in one row in a rod lens array 2 for one-to-one imaging with their optical axes 1a in parallel. However, the present invention is not limited to rod lens arrays with this configuration. For example, employing the same configuration as in the above-described first to third embodiment, the same effect also can be attained if, as shown in FIGS. 29 and 30, a plurality of rod lenses 1 with a refractive index distribution in the radial direction is arranged in two or more rows in a rod lens array 15 for one-to-one imaging with their optical axes 1a in parallel.

Also, the above-described first to third embodiments have been explained by way of examples in which the rod lenses 1 are arranged in a rod lens array 2. However, the present invention does not necessarily have to be applied to a rod lens array 2, and can be applied in a similar fashion to lens arrays in general, in which optical lens systems are arranged in one or more rows with their optical axes in parallel. For example, the present invention also can be applied to a homogenous erect one-to-one lens array in which two homogenous lens array plates, on which convex microlenses whose front and back surface have a certain curvature are arranged regularly, are stacked on top of each other.

Fifth Embodiment

Figure 31:
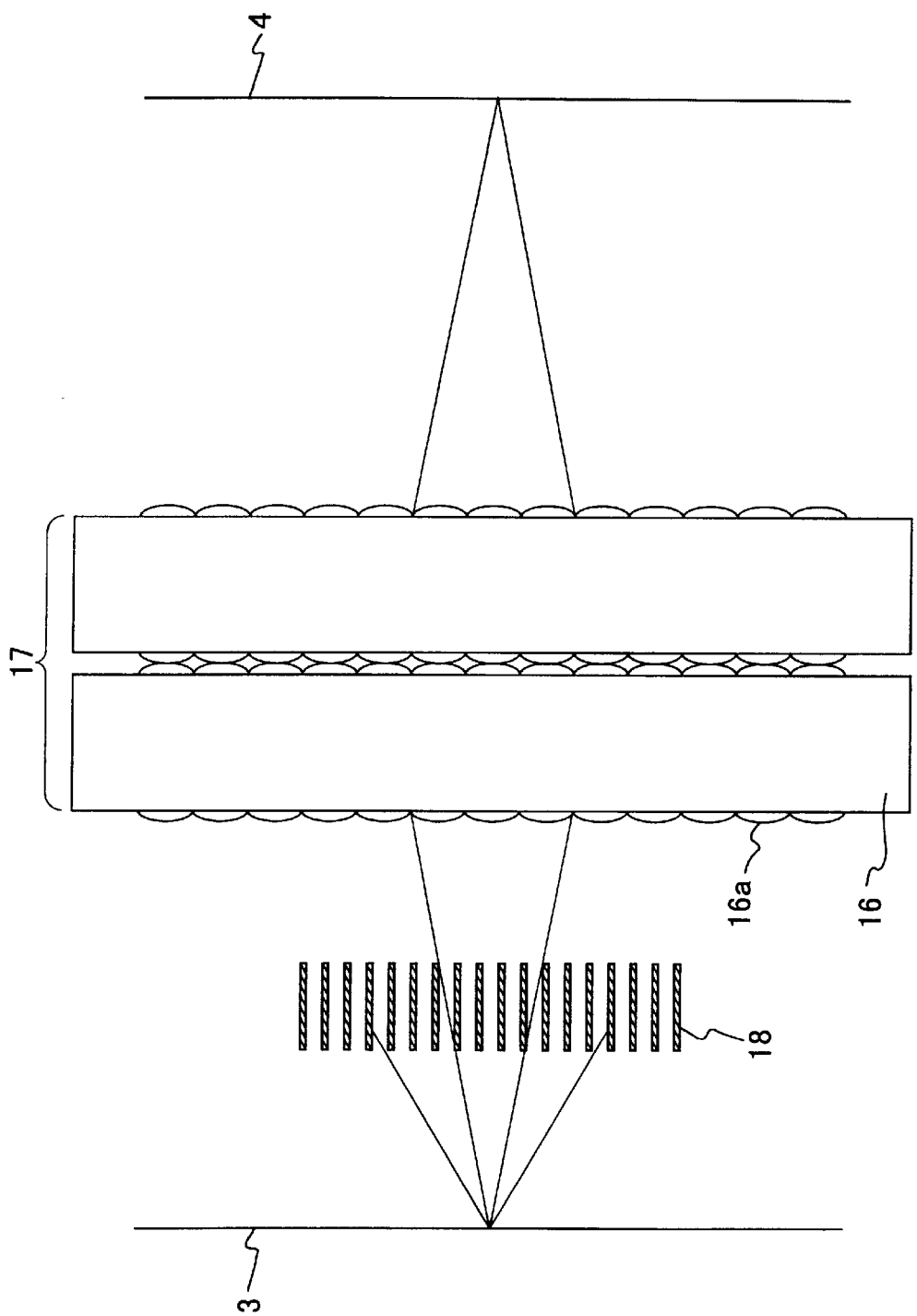
FIG. 31 is a layout drawing showing a configuration of an optical imaging system according to a fifth embodiment of the present invention.
Figure 32:
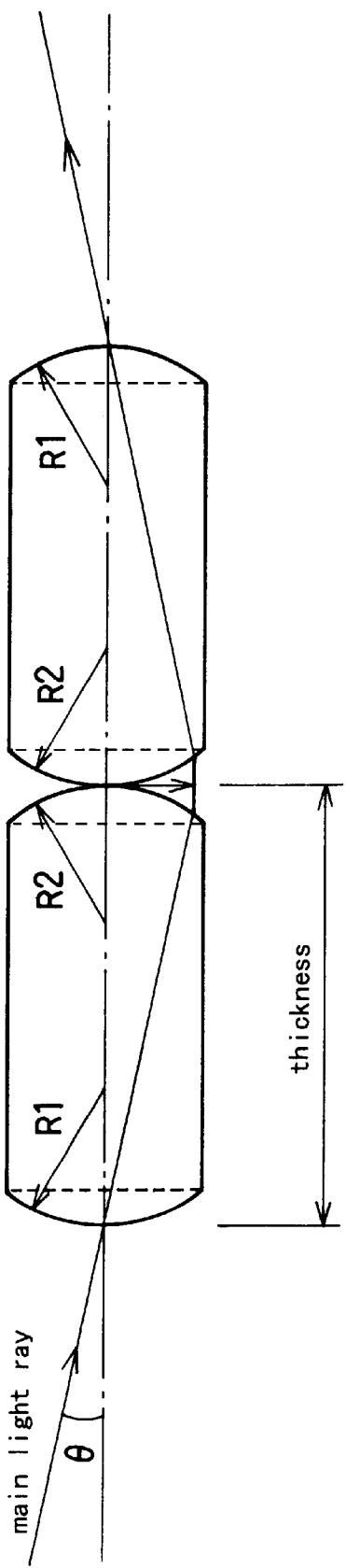
FIG. 32 is a schematic drawing showing the optical systems of the lens array used in an optical imaging system according to the fifth embodiment of the present invention.

FIG. 31 is a layout drawing showing a configuration of an optical imaging system according to a fifth embodiment of the present invention. FIG. 32 is a schematic view of an optical system in the lens array used in this optical imaging system.

As is shown in FIGS. 31 and 32, two homogenous lens array plates 16, on which convex microlenses 16a whose front and back surface have a certain curvature and which have been molded in one piece by injection molding are arranged regularly and stacked on top of each other, thereby constituting a homogenous erect one-to-one lens array 17. Also, an object plane 3 and an image plane 4 are arranged on both sides of the homogenous erect one-to-one lens array 17.

With this configuration, the incidence angle θ, which depends upon (i) the height of the reverted image formed at the center of the lens faces opposing each other in the homogenous lens array plates 16 and (ii) the thickness of the homogenous lens array plates 16, becomes the aperture angle of the homogenous erect one-to-one lens array 17, as shown in FIG. 32. This means that light rays with an angle of up to θ reach the image plane 4, whereas light rays with an angle of more than θ are spread as stray light to the adjacent lenses.

In order to prevent such stray light, in this embodiment shown in FIG. 31, a plurality of planar light-angle restricting plates (light-blocking plates) 18 are arranged at certain intervals in the longitudinal direction of the homogenous erect one-to-one lens array 17 within the operating distance (i.e. in the space between the homogenous erect one-to-one lens array 17 and the object plane 3) on the side of the object plane 3 of the homogenous erect one-to-one lens array 17. The normals of the light-angle restricting plates 18 face in the longitudinal direction of the homogenous erect one-to-one lens array 17. The normals of the light-angle restricting plates 18 face in the longitudinal direction of the homogenous erect one-to-one lens array 17. Thus, stray light can be prevented by eliminating light rays with an angle that is larger than the aperture angle θ before they enter the homogenous erect one-to-one lens array 17. As a result, the contrast of the image at the image plane 4 is improved, so that the transmission of a high quality image becomes possible. Moreover, providing such planar light-angle restricting plates 18 within the operating distance on the side of the object plane 3 or the image plane 4 of the homogenous erect one-to-one lens array 17 has the effect that light rays corresponding to the image portion with large image surface curvature are blocked, so that using such a homogenous erect one-to-one lens array 17 improves the resolving power.

The length of the light-angle restricting plates 18 in the direction of the optical axis of the optical lens systems and the intervals (pitch) between adjacent light-angle restricting plates 18 depends on the aperture angle θ, and the transmitted light amount depends on the thickness of the light-angle restricting plates 18. The following Tables 5 to 7 show the relation between the light ray incidence angle (for the light ray incidence angles 12°, 15° and 20°) on the one hand and the length of the light-angle restricting plates 18 in the direction of the optical axis, the intervals (pitch) between adjacent light-angle restricting plates 18, and the thickness of the light-angle restricting plates 18 on the other hand.

TABLE 5 light ray incidence angle 12°

| plate length | pitch width | plate thickness (mm) (aperture ratio in %) | | |
|---|---|---|---|---|
| (mm) | (mm) | 70% | 75% | 80% |
| 0.5 | 0.106 | 0.020 | 0.016 | 0.013 |
| 1.0 | 0.213 | 0.042 | 0.033 | 0.025 |
| 1.5 | 0.319 | 0.062 | 0.049 | 0.038 |
| 2.0 | 0.425 | 0.082 | 0.066 | 0.050 |

TABLE 6 light ray incidence angle 15°

| plate length | pitch width | plate thickness (mm) (aperture ratio in %) | | |
|---|---|---|---|---|
| (mm) | (mm) | 70% | 75% | 80% |
| 0.5 | 0.134 | 0.026 | 0.021 | 0.016 |
| 1.0 | 0.268 | 0.052 | 0.041 | 0.032 |
| 1.5 | 0.402 | 0.078 | 0.062 | 0.047 |
| 2.0 | 0.536 | 0.105 | 0.083 | 0.063 |

TABLE 7 light ray incidence angle 20°

| plate length | pitch width | plate thickness (mm) (aperture ratio in %) | | |
|---|---|---|---|---|
| (mm) | (mm) | 70% | 75% | 80% |
| 0.5 | 0.182 | 0.036 | 0.028 | 0.021 |
| 1.0 | 0.364 | 0.071 | 0.056 | 0.043 |
| 1.5 | 0.546 | 0.107 | 0.084 | 0.064 |
| 2.0 | 0.728 | 0.142 | 0.113 | 0.086 |

The material of the light-angle restricting plates 18 can be, for example, metal or resin, and while there is no particular restriction with regard to the material of the light-angle restricting plates 18, it is preferable that it is a material that absorbs light, and that its reflectivity is not more than 10%. It is possible to use, for example, stainless steel, phosphor bronze, beryllium steel or the like for the light-angle restricting plates 18.

Thus, this embodiment achieves similar or better properties as a lens array for one-to-one imaging in which a plurality of columnar rod lenses is arranged in one row with their optical axes 1a in parallel simply by setting light-angle restricting plates 18 in front of the homogenous erect one-to-one lens array 17 made by molding lenses in one piece, for example by injection molding, thereby allowing a considerable reduction in production costs.

In this embodiment, the light-angle restricting plates 18 are provided only in the operational distance on the side of the manuscript plane 3 of the homogenous erect one-to-one lens array 17, but there is no limitation to this configuration, and the same effect can be attained if the light-angle restricting plates 18 are provided only in the operational distance on the side of the image plane 4, as this cuts stray light with a large angle while letting the light rays necessary for image formation pass. Moreover, the same effect can be attained if the light-angle restricting plates 18 are provided in both the operational distance on the side of the manuscript plane 3 and in the operational distance on the side of the image plane 4 of the homogenous erect one-to-one lens array 17. It is preferable that the light-angle restricting plates 18 are provided more toward the side of the homogenous erect one-to-one lens array 17 seen from the center of the operational distance, as this reduces irregularities in the light amount on the image plane 4.

Figure 33:
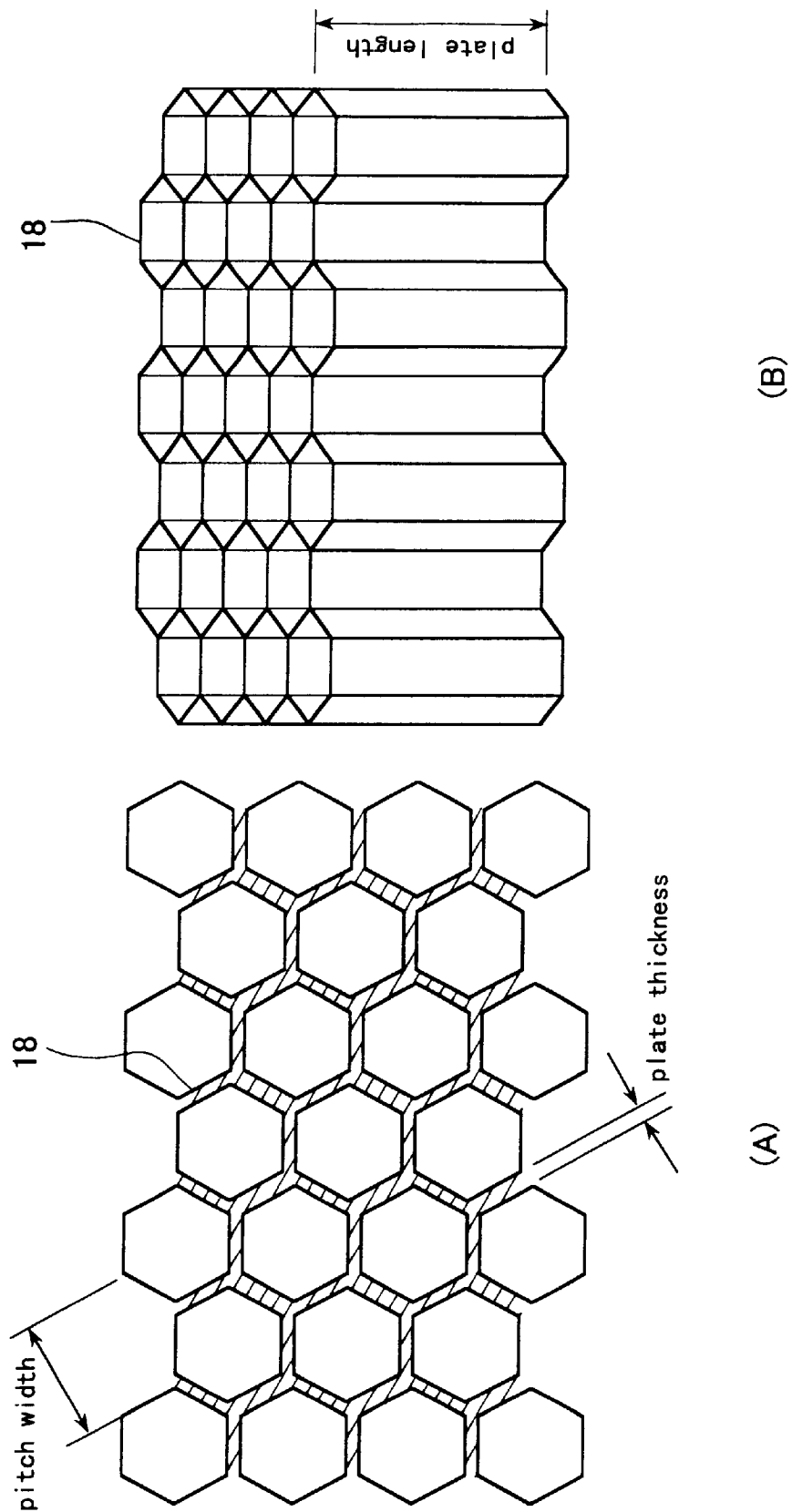
FIG. 33(A) is a top view showing another configuration of the incident light-angle restricting plates used in an optical imaging system according to the fifth embodiment of the present invention.
FIG. 33(B) is a perspective view thereof.

Moreover, when the convex microlenses 16a are arranged in two-dimensional array on the homogenous lens array plates 16 the light-angle restricting plates 18 should have a shape that restricts the angle of light rays with respect to any orientation. A shape in which the difference in the restriction angles depends only slightly on orientation, in which the plates can be made thin, and which is easy to manufacture is, for example, the honeycomb-shape shown in FIG. 33. Also in this case, the length of the light-angle restricting plates 18 in the direction of the optical axis and the intervals (pitch) between adjacent light-angle restricting plates 18 depends on the aperture angle θ, and the transmitted light amount depends on the thickness of the light-angle restricting plates 18.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical imaging system for focusing light from an object plane onto an image plane, comprising:
   a lens array having a plurality of optical lens systems that are arranged in at least one row with optical axes of the lens system in parallel, wherein the optical lens systems comprise rod lenses having a refractive index distribution in a radial direction; and
   a non-circular means for blocking, in at least a longitudinal direction of the lens array, light rays that pass through the lens faces of the optical lens systems at an angle larger than a predetermined angle with respect to the optical axes of the optical lens system.

2. The optical imaging system according to claim 1, wherein the refractive index distribution of the rod lenses can be expressed by $$n(r)^2 = n_0^2 \cdot \{1 - (g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

3. The optical imaging system according to claim 2, wherein an aperture angle θ of the rod lenses, which is defined as $\theta = (n_0 \cdot g \cdot r_0)/(\pi/180)$, is in the range given by $4° \leq \theta \leq 40°$.

4. The optical imaging system according to claim 2, wherein the refractive index $n_0$ at the optical axis of the rod lenses is in the range given by $1.4 \leq n_0 \leq 1.9$.

5. The optical imaging system according to claim 2, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

6. The optical imaging system according to claim 2, wherein $Z_0/P$ is in a range given by $$0.5 \leq Z_0/P \leq 1.0$$

wherein $Z_0$ is a length of the rod lenses and $P = 2\pi/g$ is a one-pitch length of the rod lenses.

7. An optical imaging system for focusing light from an object plane onto an image plane, comprising:
   a lens array having a plurality of optical lens systems that are arranged in at least one row with optical axes of the lens systems in parallel, wherein the optical lens systems comprise rod lenses having a refractive index distribution in a radial direction, wherein both edge portions of the rod lenses in the longitudinal direction of the lens array are shaved off along an optical axes of the rod lenses; and
   means for blocking, in at least a longitudinal direction of the lens array, light rays that pass through the lens faces of the optical lens systems at an angle larger than a predetermined angle with respect to the optical axes of the optical lens systems.

8. The optical imaging system according to claim 7, wherein $r_y/r_0$ is in a range given by $$0.1 \leq r_y/r_0 \leq 0.8$$

wherein $r_0$ is a radius of a portion of the rod lenses functioning as a lens, and $2r_y$ is a length in the longitudinal direction of the lens array of the rod lenses after both edge portions of the rod lenses in the longitudinal direction of the lens array have been shaved off along the optical axis of the rod lenses.

9. An optical imaging system for focusing light from an object plane onto an image plane, comprising:
   a lens array having a plurality of optical lens systems that are arranged in at least one row with optical axes of the lens systems in parallel, wherein the optical lens systems comprise rod lenses having a refractive index distribution in a radial direction, wherein pairs of cut-outs are provided that oppose each other in a substantially central portion in a direction of the optical axes of the rod lenses, and normals of faces of the cut-outs that oppose each other point into the longitudinal direction of the lens array; and
   means for blocking, in at least a longitudinal direction of the lens array, light rays that pass through the lens faces of the optical lens systems at an angle larger than a predetermined angle with respect to the optical axes of the optical lens systems.

10. The optical imaging system according to claim 9, wherein $r_y/r_0$ is in a range given by $$0.1 \leq r_y/r_0 \leq 0.8$$

wherein $r_0$ is a radius of a portion of the rod lenses functioning as a lens, and $2r_y$ is a distance between the opposing faces of the pairs of cut-outs.

11. An optical imaging system for focusing light from an object plane onto an image plane, comprising:
   a lens array having a plurality of optical lens systems that are arranged in at least one row with optical axes of the lens system in parallel;
   a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises substantially elliptical aperture stops provided in at least one space selected from a space between the lens array and the object plane and a space between the lens array and the image plane.

12. The optical imaging system according to claim 11, wherein the aperture stops are disposed at a distance from an end face of the optical lens systems.

13. The optical imaging system according to claim 11, wherein a thickness of the aperture stops in the direction of the optical axes of the lenses is in a range of $r_0$ to $5r_0$, wherein $r_0$ is a radius of a portion of the rod lenses functioning as a lens.

14. The optical imaging system according to claim 11, wherein the aperture stops are disposed in multiple stages.

15. The optical imaging system according to claim 11 wherein the aperture stops are formed by blackening a surface of a transparent plate with a printed pattern.

16. An optical imaging system for focusing light from an object plane onto an image plane, comprising:
   a lens array having a plurality of optical lens systems that are arranged in at least one row with optical axes of the lens system in parallel; and
   a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises substantially rectangular aperture stops provided in at least one space selected from a space between the lens array and the object plane and a space between the lens array and the image plane,
   wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the substantially rectangular aperture stops, in the longitudinal direction of the lens array.

17. The optical imaging system according to claim 16, wherein the refractive index distribution of the rod lenses can be expressed by $$n(r)^2 = n_0^2 \cdot \{1 - (g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

18. The optical imaging system according to claim 17, wherein an aperture angle θ of the rod lenses, which is defined as $\theta = (n_0 \cdot g \cdot r_0)/(\pi/180)$, is in the range given by $4° \leq \theta \leq 40°$.

19. The optical imaging system according to claim 17, wherein the refractive index $n_0$ at the optical axis of the rod lenses is in the range given by $1.4 \leq n_0 \leq 1.9$.

20. The optical imaging system according to claim 17, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

21. The optical imaging system according to claim 17, wherein $Z_0/P$ is in a range given by $$0.5 \leq Z_0/P \leq 1.0$$

wherein $Z_0$ is a length of the rod lenses and $P = 2\pi/g$ is a one-pitch length of the rod lenses.

22. An optical imaging system for focusing light from an object plane onto an image plane, comprising:
   a lens array having a plurality of optical lens systems that are arranged in at least one row with optical axes of the lens system in parallel, wherein the lens array comprises an erect one-to-one lens array in which two homogeneous lens array plates are stacked on top of each other, with microlenses, whose front and back surface have a certain curvature and which function as convex lenses, being arranged regularly in the two homogeneous lens array plates; and
   a means for blocking, in at least a longitudinal direction of the lens array, light rays that pass through the lens faces of the optical lens systems at an angle larger than a predetermined angle with respect to the optical axes of the optical lens systems.

23. The optical imaging system according to claim 22, wherein the means for blocking light rays comprises light-blocking plates disposed in at least one space selected from the group consisting of the space between the lens array and the object plane and the space between the lens array and the image plane, and the light-blocking plates are arranged periodically in two dimensions in a direction parallel to the object plane and the image plane.

24. The optical imaging system according to claim 23, wherein a space between adjacent light-blocking plates is filled with a transparent medium.

25. The optical imaging system according to claim 23, wherein the light-blocking plates are disposed at a distance from an end face of the optical lens systems.

26. The optical imaging system according to claim 23, wherein the light-blocking plates are honeycomb-shaped.

27. An optical imaging system for focusing light from an object plane onto an image plane, comprising:
   a lens array having a plurality of optical lens systems that are arranged in at least one row with optical axes of the lens system in parallel wherein the lens array comprises a homogenous erect one-to-one lens array, in which two homogenous lens array plates are stacked on top of each other, with microlenses, whose front and back surface have a certain curvature and which function as convex lenses, being arranged regularly in the two homogenous lens array plates, and the lens array is made by injection molding; and
   a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises light-blocking plates disposed in at least one space selected from the group consisting of the space between the lens array and the object plane and the space between the lens array and the image plane; and
   wherein the light-blocking plates are arranged periodically in a longitudinal direction of the lens array.

28. The optical imaging system of claim 27, wherein the light-blocking plates are flat and the light-blocking plates are arranged at constant intervals in the longitudinal direction of the lens array.

29. The optical imaging system of claim 28, wherein a space between adjacent light-blocking plates is filled with a transparent medium.

30. The optical imaging system according to claim 28, wherein the light-bldcking plates are disposed at a distance from an end face of the optical lens systems.

31. The optical imaging system according to claim 28, wherein the thickness of the light-blocking plates in the longitudinal direction of the lens array is not more than ⅕ of a pitch length of the intervals of the light-bloking plate.

32. The optical imaging system according to claim 28, wherein the interval pitch of the light-blocking plates is smaller than the pitch of the optical lens systems.

33. An optical imaging system for focusing light from an object plane onto an image plane, comprising:
   a lens array having a plurality of optical lens systems that are arranged in at least one row with optical axes of the lens system in parallel; and
   a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises substantially elliptical aperture stops provided in at least one space selected from a space between the lens array and the object plane and a space between the lens array and the image plane,
   wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the substantially elliptical aperture stops, in the longitudinal direction of the lens array.

34. The optical imaging system according to claim 33, wherein the refractive index distribution of the rod lenses can be expressed by $$n(r)^2 = n_0^2 \cdot \{1 - (g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

35. The optical imaging system according to claim 34, wherein an aperture angle $\theta = (n_0 \cdot g \cdot r_0)/(\pi/180)$, is in the range given by $4° \leq \theta \leq 40°$.

36. The optical imaging system according to claim 34, wherein the refractive index $n_0$ at the optical axis of the rod lenses is in the range given by $1.4 \leq n_0 \leq 1.9$.

37. The optical imaging system according to claim 34, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

38. The optical imaging system according to claim 34, wherein $Z_0/P$ is in a range given by $$0.5 \leq Z_0/P \leq 1.0$$

wherein $Z_0$ is a length of the rod lenses and $P = 2\pi/g$ is a one-pitch length of the rod lenses.

39. An optical imaging system for focusing light from an object plane onto an image plane, comprising:
   a lens array having a plurality of optical lens systems that are arranged in at least one row with optical axes of the lens system in parallel; and
   a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises aperture stops provided in at least one space selected from a space between the lens array and the object plane and a space between the lens array and the image plane,
   wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the aperture stops, in the longitudinal direction of the lens array, wherein the aperture stops are disposed at a distance from an end face of the optical lens systems.

40. The optical imaging system according to claim 39, wherein the refractive index distribution of the rod lenses can be expressed by $$n(r)^2 = n_0^2 \cdot 1\{-(g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

41. The optical imaging system according to claim 40, wherein an aperture angle $\theta = (n_0 \cdot g \cdot r_0)/(\pi/180)$, is in the range given by $4° \leq \theta \leq 40°$.

42. The optical imaging system according to claim 40, wherein the refractive index $n_0$ at the optical axis of the rod lenses is in the range given by $1.4 \leq n_0 \leq 1.9$.

43. The optical imaging system according to claim 40, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

44. The optical imaging system according to claim 40, wherein $Z_0/P$ is in a range given by $$0.5 \leq Z_0/P \leq 1.0$$

wherein $Z_0$ is a length of the rod lenses and $P = 2\pi/g$ is a one-pitch length of the rod lenses.

45. An optical imaging system for focusing light from an object plane onto an image plane, comprising:
   a lens array having a plurality of optical lens systems that are arranged in at least one row with optical axes of the lens system in parallel; and
   a means for blocking, in a longitudinal direction of the lens array, light rays that pass through the lens faces of the optical lens systems at an angle larger than a predetermined angle with respect to the optical axes of the optical lens systems, wherein the means for blocking light rays comprises aperture stops provided in at least one space selected from a space between the lens array and the object plane and a space between the lens array and the image plane, wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the aperture stops, in the longitudinal direction of the lens array, wherein a thickness of the aperture stops in the direction of the optical axes of the lenses is in a range of $r_0$ to $5r_0$.

46. The optical imaging system according to claim 45, wherein the refractive index distribution of the rod lenses can be expressed by $$n(r)^2 = n_0^2 \cdot \{1-(g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

47. The optical imaging system according to claim 46, wherein an aperture angle $\theta=(n_0 \cdot g \cdot r_0)/(\pi/180)$, is in the range given by $4° \leq \theta \leq 40°$.

48. The optical imaging system according to claim 46, wherein the refractive index $n_0$ at the optical axis of the rod lenses is in the range given by $1.4 \leq n_0 \leq 1.9$.

49. The optical imaging system according to claim 46, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

50. The optical imaging system according to claim 46, wherein $Z_0/P$ is in a range given by $$0.5 \leq Z_0/P \leq 1.0$$

wherein $Z_0$ is a length of the rod lenses and $P=2\pi/g$ is a one-pitch length of the rod lenses.

51. An optical imaging system for focusing light from an object plane onto an image plane, comprising:

a lens array having a plurality of optical lens systems that are arranged in at least one row with optical axes of the lens system in parallel; and a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises aperture stops provided in at least one space selected from a space between the lens array and the object plane and a space between the lens array and the image plane, wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the aperture stops, in the longitudinal direction of the lens array, wherein the aperture stops are disposed in multiple stages.

52. The optical imaging system according to claim 51, wherein the refractive index distribution of the rod lenses can be expressed by $$n(r)^2 = n_0^2 \cdot \{1-(g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

53. The optical imaging system according to claim 52, wherein an aperture angle $\theta=(n_0 \cdot g \cdot r_0)/(\pi/180)$, is in the range given by $4° \leq \theta \leq 40°$.

54. The optical imaging system according to claim 52, wherein the refractive index $n_0$ at the optical axis of the rod lenses is in the range given by $1.4 \leq n_0 \leq 1.9$.

55. The optical imaging system according to claim 52, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

56. The optical imaging system according to claim 52, wherein $Z_0/P$ is in a range given by $$0.5 \leq Z_0/P \leq 1.0$$

wherein $Z_0$ is a length of the rod lenses and $P=2\pi/g$ is a one-pitch length of the rod lenses.

57. An optical imaging system for focusing light from an object plane onto an image plane, comprising:

a lens array having a plurality of optical lens systems that are arranged in at least one row with optical axes of the lens system in parallel; and a means for blocking, in at least a longitudinal direction of the lens array, light rays that pass through the lens faces of the optical lens systems at an angle larger than a predetermined angle with respect to the optical axes of the optical lens systems, wherein the means for blocking light rays comprises aperture stops provided in at least one space selected from a space between the lens array and the object plane and a space between the lens array and the image plane, wherein the optical lens systems comprises rod lenses with a refractive index distribution in a radial direction, and $r_y/r_0$ is in a range given by $$0.1 \leq r_y/r_0 \leq 0.9$$

wherein $r_0$ is a radius of a portion of the rod lenses functioning as a lens, and $r_y$ is an effective radius of the rod lenses, which are restricted by the aperture stops, in the longitudinal direction of the lens array, wherein the aperture stops are formed by blackening a surface of a transparent plate with a printed pattern.

58. The optical imaging system according to claim 57, wherein the refractive index distribution of the rod lenses can be expressed by $$n(r)^2 = n_0^2 \cdot \{1 - (g \cdot r)^2 + h_4 \cdot (g \cdot r)^4 + h_6 \cdot (g \cdot r)^6\}$$

wherein r is a radial distance from an optical axis of the rod lenses, $n_0$ is a refractive index at the optical axis of the rod lenses, and g, $h_4$ and $h_6$ are coefficients for a refractive index distribution.

59. The optical imaging system according to claim 58, wherein an aperture angle $\theta = (n_0 \cdot g \cdot r_0)/(\pi/180)$, is in the range given by $4 \leq \theta \leq 40°$.

60. The optical imaging system according to claim 58, wherein the refractive index $n_0$ at the optical axis of the rod lenses is in the range given by $1.4 \leq n_0 \leq 1.9$.

61. The optical imaging system according to claim 58, wherein $r_0/R$ is in a range given by $$0.5 \leq r_0/R \leq 1.0$$

wherein $r_0$ is a radius of a portion of the rod lens functioning as a lens, and 2R is a distance 2R between the optical axes of two adjacent rod lenses.

62. The optical imaging system according to claim 58, wherein $Z_0/P$ is in a range given by $$0.5 \leq Z_0/P \leq 1.0$$

wherein $Z_0$ is a length of the rod lenses and $P = 2\pi/g$ is a one-pitch length of the rod lenses.

* * * * *